US012416536B2

(12) United States Patent
Javidan et al.

(10) Patent No.: US 12,416,536 B2
(45) Date of Patent: *Sep. 16, 2025

(54) SYSTEM AND METHOD FOR DYNAMIC TOW OF A TRAILER

(71) Applicant: Range Energy Inc., Mountain View, CA (US)

(72) Inventors: Ali Javidan, Sunnyvale, CA (US); Kyle Foley, Half Moon Bay, CA (US); Kyle Pollard, Kirkland, WA (US); Bryan Booth, San Mateo, CA (US); Ryan Flatland, Redwood City, CA (US); Collin MacGregor, Redwood City, CA (US); David Sands, San Mateo, CA (US)

(73) Assignee: Range Energy Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,218

(22) Filed: Mar. 22, 2024

(65) Prior Publication Data

US 2024/0264019 A1 Aug. 8, 2024

Related U.S. Application Data

(63) Continuation of application No. 18/238,408, filed on Aug. 25, 2023, now Pat. No. 11,965,795.

(60) Provisional application No. 63/431,273, filed on Dec. 8, 2022, provisional application No. 63/420,469, filed on Oct. 28, 2022, provisional application No. 63/401,030, filed on Aug. 25, 2022.

(51) Int. Cl.
G01L 5/13 (2006.01)
B60T 8/17 (2006.01)
B62D 53/08 (2006.01)

(52) U.S. Cl.
CPC ............ *G01L 5/136* (2013.01); *B60T 8/1708* (2013.01); *B62D 53/0842* (2013.01); *B62D 53/0857* (2013.01)

(58) Field of Classification Search
CPC ... G01L 5/136; B60T 8/1708; B62D 53/0842; B62D 53/0857
See application file for complete search history.

(56) References Cited

U.S. PATENT DOCUMENTS 10,189,476 B1 * 1/2019 Edren ................. B60L 15/2036
2023/0327475 A1 * 10/2023 Ducher .............. B62D 53/0842
701/36

* cited by examiner

Primary Examiner — Eric S. McCall
(74) Attorney, Agent, or Firm — Run8 Patent Group, LLC; Peter Miller

(57) ABSTRACT

One variation of a method includes, during a first time period: detecting a direction of motion of a trailer; detecting a first force applied to a kingpin; detecting an incline angle of the trailer; calculating a first target preload force opposite the direction of motion and inversely proportional to the incline angle; and in response to the first force falling below the first target preload force, triggering a motor to increase torque output opposite the direction of motion. The method further includes, during a second time period: detecting a second force applied to the kingpin; detecting a decline angle of the trailer; calculating a second target preload force opposite the direction of motion and inversely proportional to the decline angle; and in response to the second force falling below the second target preload force, triggering the motor to increase torque output opposite the direction of motion.

20 Claims, 12 Drawing Sheets

SYSTEM AND METHOD FOR DYNAMIC TOW OF A TRAILER

CROSS-REFERENCE TO RELATED APPLICATIONS

This Application is a continuation application of U.S. patent application Ser. No. 18/238,408, filed on 25 Aug. 2023, which claims the benefit of U.S. Provisional Application No. 63/401,030, filed on 25 Aug. 2022, 63/420,469, filed on 28 Oct. 2022, and 63/431,273, filed on 8 Dec. 2022, each of which is incorporated in its entirety by this reference.

TECHNICAL FIELD

This invention relates generally to the field of tow control and more specifically to a new and useful system and method for dynamic tow of a trailer in the field of tow control.

DESCRIPTION OF THE EMBODIMENTS

Figure 1A:
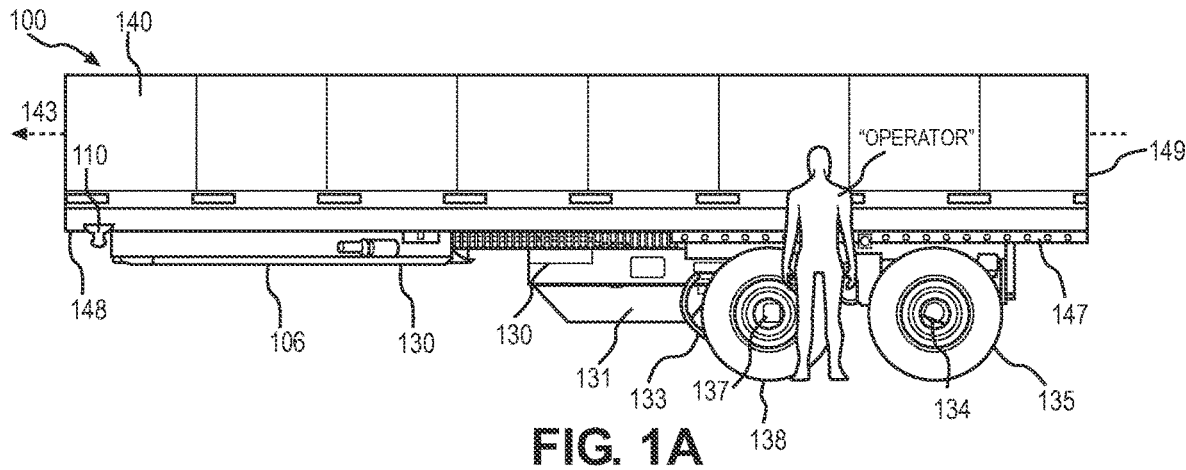
FIGS. 1A, 1B, and 1C are schematic representations of a system.
Figure 1B:
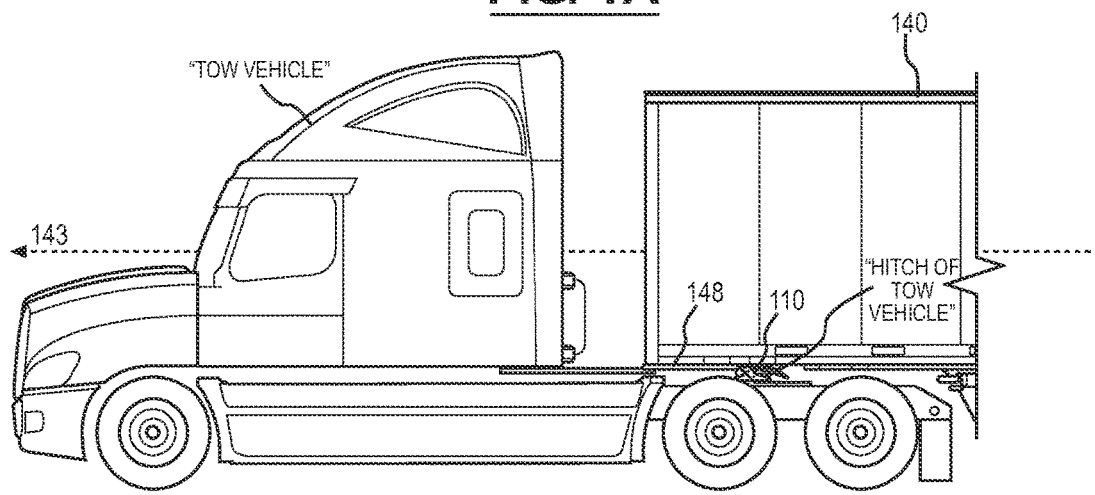
Figure 1C:
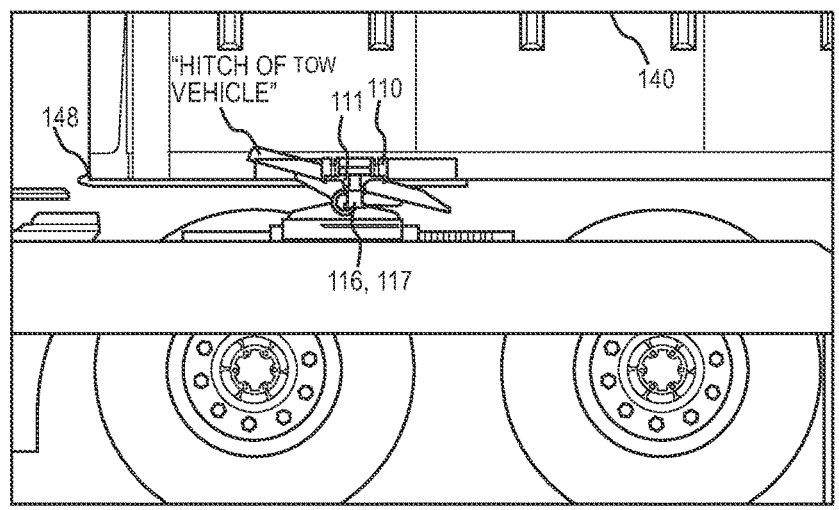

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1A, 2A, 2B, 6B and 6C, a system 100 for dynamic tow of a trailer 140 includes: a kingpin 110; and a controller 150. The kingpin 110 includes: a head 117; a base coupled to a proximal end of the trailer 140 and configured to transfer vertical loads from the trailer 140 into a hitch of a tow vehicle; a shank 116 interposed between the head 117 and the base and configured to transiently couple to the hitch of the tow vehicle; a first sensor 119 configured to output signals representing lateral forces applied to the kingpin 110; and a second sensor 119 configured to output signals representing longitudinal forces applied to the kingpin 110. The controller 150 is configured to: access a first signal from the first sensor 119 representing a first lateral force applied to the kingpin 110; access a second signal from the second sensor 119 representing a first longitudinal force applied to the kingpin 110; calculate a first direction and a first magnitude of a first force applied to the kingpin 110 based on the first signal and the second signal; and trigger a motor arranged on a distal end 149 of the trailer 140, opposite the kingpin 110, to output a first torque in the first direction of the first force and proportional to the first magnitude of the first force.

1.1 Variation: Integrated Trailer+Drive System

Figure 3A:
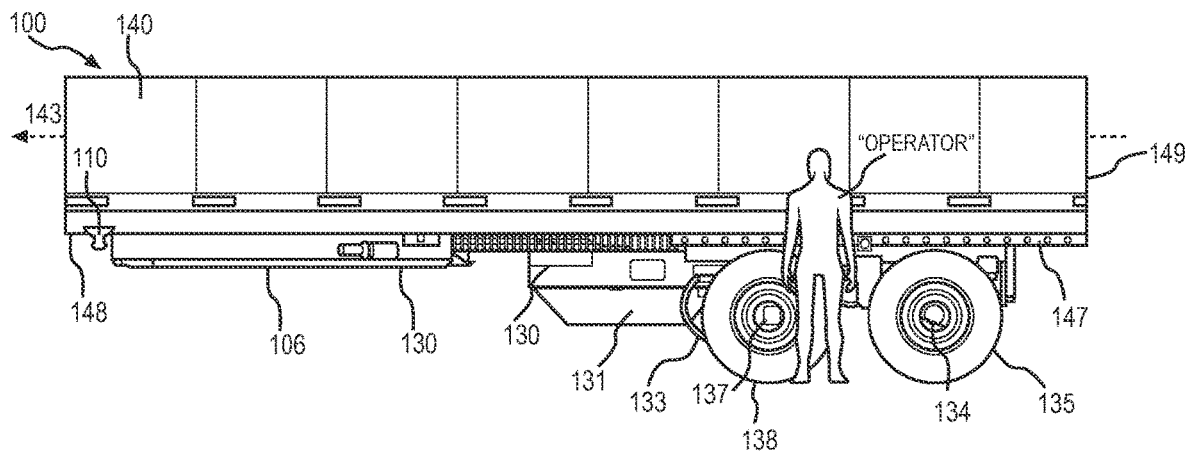
FIGS. 3A, 3B, and 3C are schematic representations of one variation of the system.
Figure 3B:
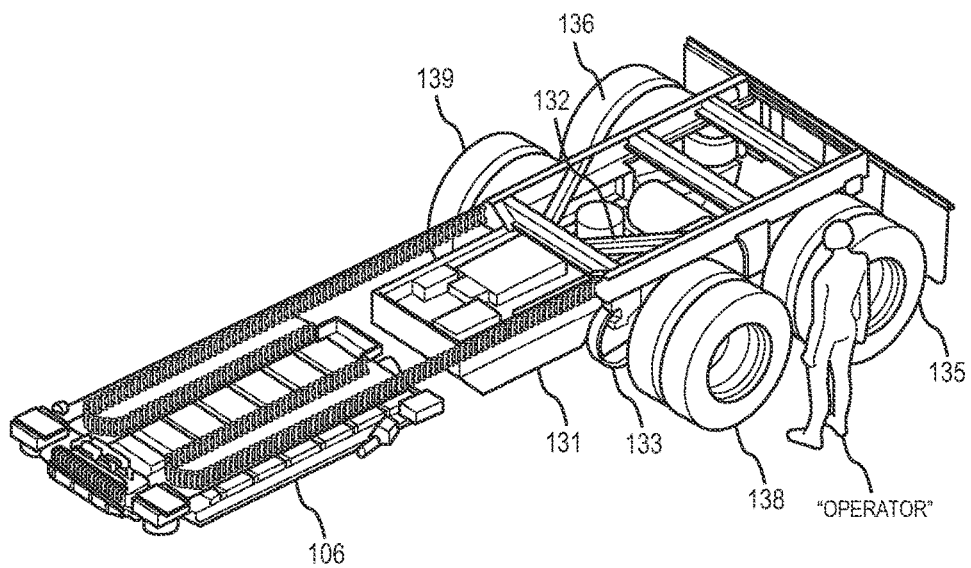
Figure 3C:
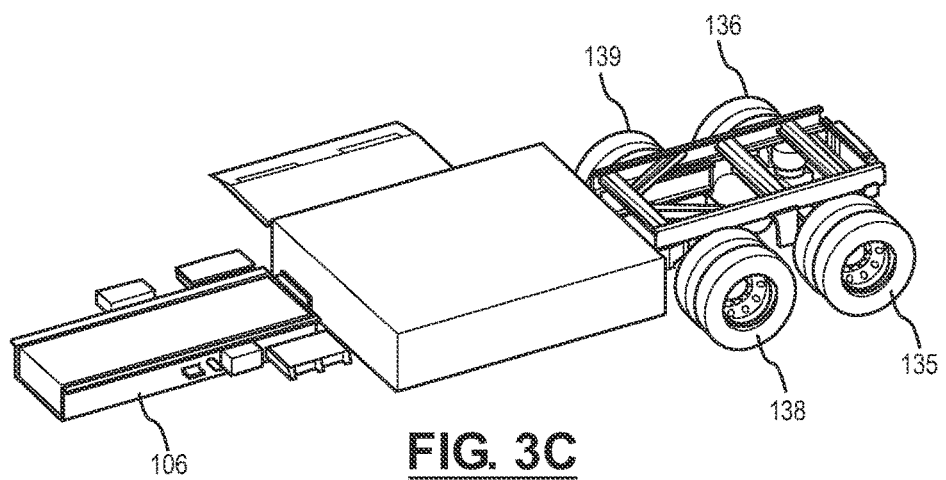

One variation of the system 100, shown in FIGS. 3A, 3B, and 3C, includes: a kingpin 110; a trailer 140; a drive system 130; and a controller 150. The kingpin 110 includes: a head 117; a base coupled to a proximal end of the trailer 140 and configured to transfer vertical loads from the trailer 140 into a hitch of a tow vehicle; a shank 116 interposed between the head 117 and the base and configured to transiently couple to the hitch of the tow vehicle; a first sensor 119 configured to output signals representing lateral forces applied to the kingpin 110; and a second sensor 119 configured to output signals representing longitudinal forces applied to the kingpin 110.

The trailer 140 includes: a floor 146; a left rail 147 coupled to the floor 146, extending parallel to and laterally offset from a longitudinal centerline 143 of the trailer 140, and defining a first array of engagement features distributed along the left rail and longitudinally offset by a pitch distance; and a right rail 147 coupled to the floor 146, extending parallel to and laterally offset from the longitudinal centerline 143 of the trailer 140 opposite the left rail 147, and defining a second array of engagement features distributed along the right rail 147 and longitudinally offset by the pitch distance.

The drive system 130 includes: a chassis; a set of latches configured to transiently engage a subset of engagement features, in the first array of engagement features on the left rail 147 and in the second array of engagement features in the right rail 147, to retain the chassis on a distal end of the trailer 140 opposite the kingpin 110; a passive axle 134 including a left passive wheel 135 and a right passive wheel 136; a driven axle 137 adjacent the passive axle 134 and including a left driven wheel 138 and a right driven wheel 139; a motor 131 mounted to the chassis, coupled to the drive axle 137; and configured to output torque to the left driven wheel 138 and to the right driven wheel 139.

1.2 Variation: Kingpin+Controller

One variation of the system 100 includes: a kingpin 110; and a controller 150. In this variation, the kingpin 110 includes: a head 117; a base coupled to a proximal end of the trailer 140; a shank 116 interposed between the head 117 and the base and configured to transiently couple to the hitch of the tow vehicle; and a set of sensors 119 configured to output a signal representing lateral forces and longitudinal forces applied to the kingpin 110. The controller 150 is configured to: access a signal from the set of sensors 119 representing a first lateral force applied to the kingpin 110; calculate a first direction and a first magnitude of a first force applied to the kingpin 110 by the hitch of the tow vehicle based on the signal; and trigger a motor 131 arranged on a distal end of the trailer 140, opposite the kingpin 110, to output a first torque in the first direction of the first force and proportional to the first magnitude of the first force.

1.3 Variation: Interface+Target Wheel Speed

Figure 5A:
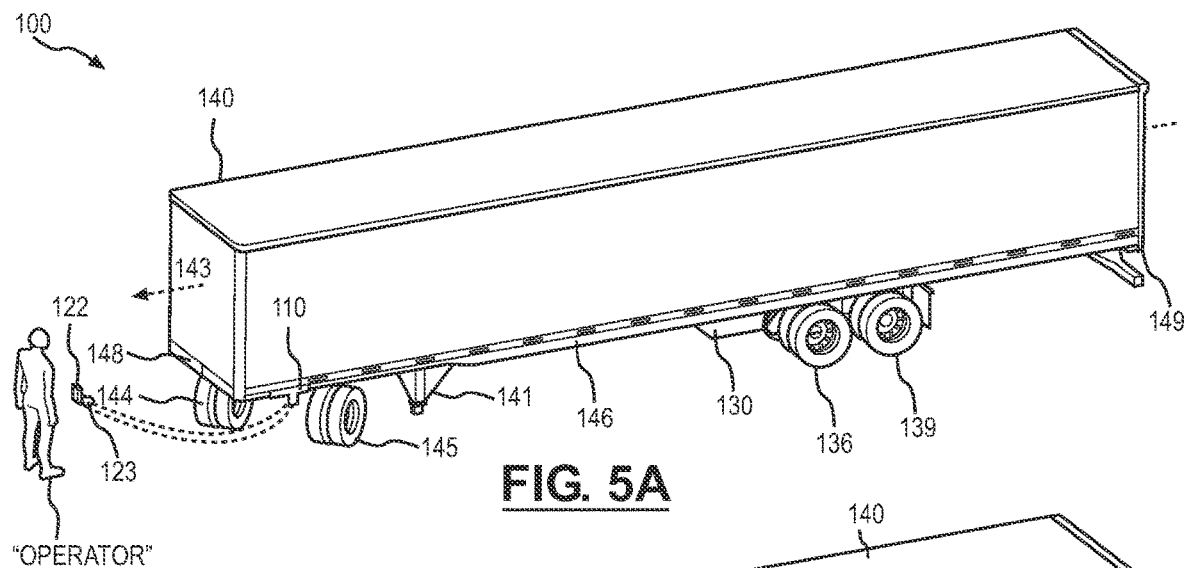
FIGS. 5A, 5B, 5C, and 5D are schematic representations of one variation of the system.
Figure 5B:
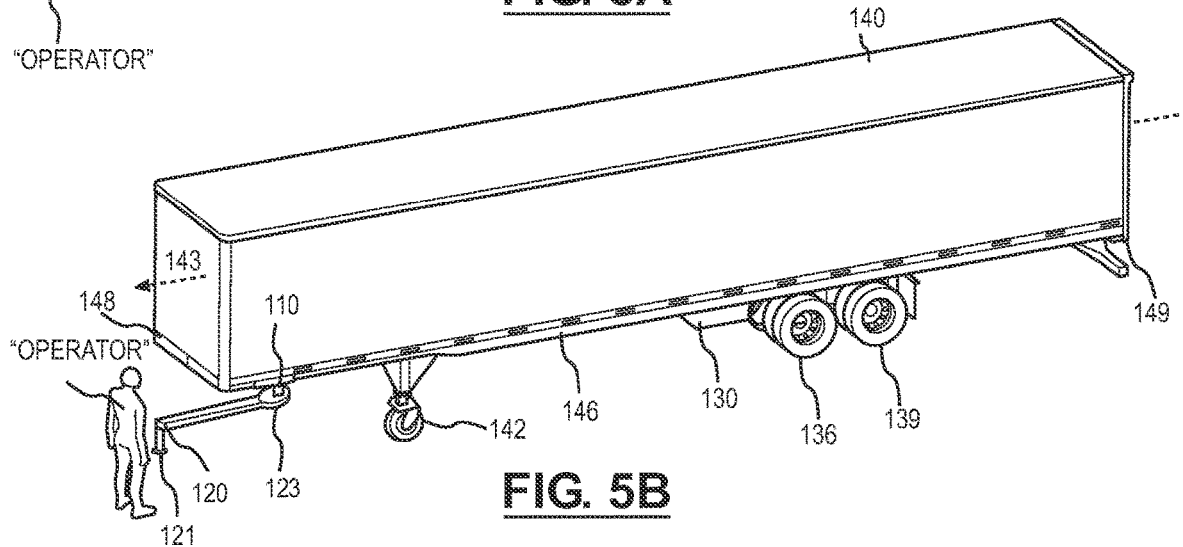
Figure 5C:
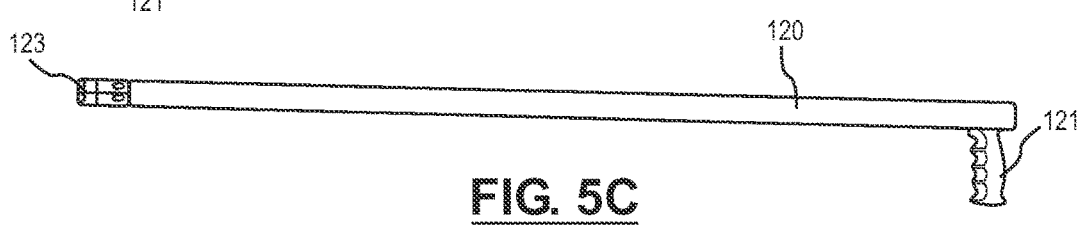
Figure 5D:
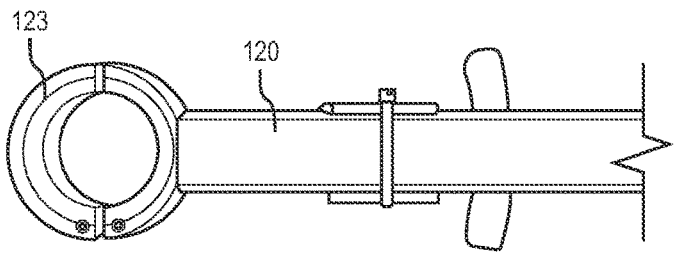

One variation of the system 100, shown in FIG. 5B, includes: a kingpin 110; an interface 120; and a controller 150. The kingpin 110 is: arranged on a proximal end 148 of the trailer 140; includes a set of sensors 119 configured to output a signal representing lateral forces and longitudinal forces applied to the kingpin 110; and configured to couple with a hitch of a tow vehicle. The interface 120 includes: a joystick 121; and a kingpin 110 interface 123 configured to transiently couple to the kingpin 110 and to transfer forces, applied to the joystick 121, into the kingpin 110.

In this variation of the system 100, the controller 150 is configured to: access the signal from the set of sensors 119; based on the signal, calculate a first direction and a first magnitude of a first force applied to the kingpin 110; calculate a target left wheel speed of a left wheel 144 of the trailer 140 proportional to the first magnitude; calculate a target right wheel speed of a right wheel 145 of the trailer 140 proportional to the first magnitude, the target right wheel speed differing from the target left wheel speed based on the first direction; and serve the target left wheel speed and the target right wheel speed to a drive system 130 arranged proximal a distal end 149 of the trailer 140 opposite the kingpin 110.

1.4 Variation: Manual Mode

Figure 7A:
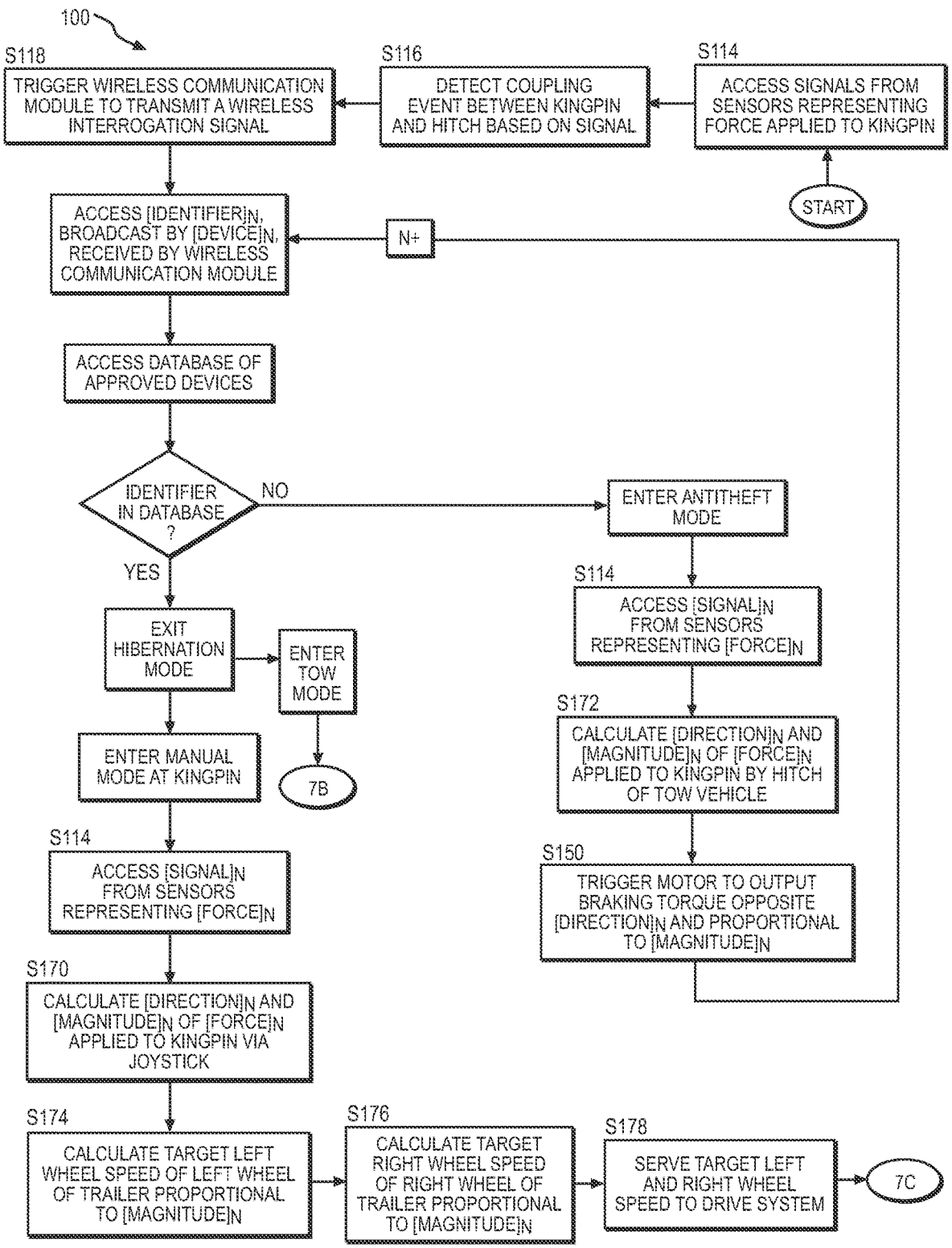
FIGS. 7A, 7B, and 7C are flowchart representations of one variation of the method.

One variation of the system 100, shown in FIG. 7A, includes: a kingpin 110; an interface 120; and a controller 150. The kingpin 110, arranged on a proximal end 148 of the trailer 140: includes a first sensor 119 configured to output a first signal representing a first lateral force applied to the kingpin 110; includes a second sensor 119 configured to output a second signal representing a first longitudinal force applied to the kingpin 110; includes a third sensor 119 configured to output a third signal representing a first vertical force applied to the kingpin 110; and is configured to couple with a hitch of a tow vehicle. The interface 120 includes a joystick 121 and a kingpin 110 interface 123 configured to transiently couple to the kingpin 110 and to transfer forces, applied to the joystick 121, into the kingpin 110.

In this variation of the system 100, the controller 150 is configured to, during an initial time period: access the third signal from the third sensor 119; based on the third signal, detect the first vertical force as null; and, based on the first vertical force, activate a manual mode. The controller 150 is further configured to, during a first time period: access the first signal from the first sensor 119 and the second signal from the second sensor 119; based on the first signal and the second signal, calculate a first direction and a first magnitude of a first force applied to the kingpin 110 via the joystick 121; calculate a target left wheel speed of a left wheel of the trailer 140 proportional to the first magnitude; calculate a target right wheel speed of a right wheel of the trailer 140 proportional to the first magnitude; and serve the target left wheel speed and the target right wheel speed to a drive system 130 arranged on a distal end 149 of the trailer 140 opposite the kingpin 110.

1.5 Variation: Analog Joystick+Single Sensor

One variation of the system 100 includes: a kingpin 110; an interface 120; and a controller 150. The kingpin 110: is arranged on a proximal end 148 of the trailer 140; includes a sensor 119 configured to output a signal representing lateral and longitudinal forces applied to the kingpin 110; and is configured to couple to a tow vehicle. The interface 120 includes an analog joystick; and a kingpin 110 interface 123 configured to transiently couple to the kingpin 110 and to transfer forces, applied to the analog joystick, into the kingpin 110.

In this variation of the system 100, the controller 150 is configured to: access the signal from the sensor 119; based on the signal, calculate a first magnitude of a first force applied to the kingpin 110; calculate a first target speed of a first wheel of the trailer 140 proportional to the first magnitude; calculate a second target speed of a second wheel of the trailer 140 opposite the first wheel and proportional to the first magnitude; and serve the first target speed and the second target speed to a drive system 130 arranged on a distal end 149 of the trailer 140 opposite the kingpin 110.

2. Applications

Generally, the system 100 is configured to dynamically tow a trailer 140 (e.g., a towed vehicle) by: accessing signals from sensors 119 representing forces applied to a kingpin 110 arranged on a proximal end 148 of the trailer 140; calculating a direction and a magnitude of each force applied to the kingpin 110 based on these signals; selectively entering a mode (e.g., a hibernation mode, a manual mode, a tow mode); identifying a coupling and/or a decoupling event between a hitch (e.g., a fifth wheel) of a tow vehicle (e.g., a tractor-trailer) and the kingpin 110 based on these forces; triggering a primary motor 131, a set of secondary motors, a primary airbrake system 107, and/or a set of secondary airbrake systems to manipulate driven wheels of the trailer 140 in a manual mode; calculating a target preload force as a function of a condition of the trailer 140 (e.g., a speed, an incline angle, a tractor-trailer 140 angle, a location, a charge state of a battery) in a tow mode; and triggering the primary motor 131, arranged in a drive system located proximal a distal end of the trailer 140, to selectively reduce torque output and/or increase torque output to decrease a difference between each force and the target preload force in the tow mode.

2.1 Hibernation Mode

Furthermore, the system 100 can include a lockout system (e.g., a mechanical propulsion lockout system, an electrical lockout system) and the controller 150 can leverage the lockout system to prevent access to any sensor 119 data, voltage data, and/or controller 150 area network data (e.g., CAN data) by an unauthorized user, device, or tow vehicle and to prevent unauthorized access, modification, or theft of the kingpin 110 and/or the trailer 140.

Additionally, in a hibernation mode, the controller 150 can detect an acceleration of the trailer 140 at the kingpin 110, identify an unauthorized movement event of the trailer 140, and enter an antitheft mode. The controller 150 can then autonomously apply a regenerative brake force to the trailer 140 proportional to the acceleration. Thus, the controller 150 can enter an antitheft mode to prevent access to the kingpin 110 and/or the trailer 140 by an unauthorized user, device, or tow vehicle.

The controller 150 can further implement a wireless communication protocol with a wireless transmitter arranged in the interface 120 and configured to broadcast an identifier to a wireless receiver arranged on the trailer 140 proximal the kingpin 110. In response to verification of receipt of the identifier via the wireless receiver, the controller 150 can enter a tow mode to calculate a maximum wheel speed or enter a manual mode (e.g., tow vehicle less control of the trailer 140 or manually operated by a user or a remote control).

2.2 Manual Mode

In manual mode, the system 100 includes an interface 120 including: a joystick 121 and a kingpin 110 interface 123 configured to transiently couple to the kingpin 110 and to transfer forces (e.g., lateral forces, longitudinal forces, vertical forces), applied to the joystick 121 by a user (e.g., an operator, a yard manager) or a remote control 122, into the kingpin 110.

Accordingly, the user (e.g., an operator, a yard manager) may manually manipulate the joystick 121 and the drive system 130 can then drive the wheels of the trailer 140 to relocate the trailer 140 according to forces applied to the joystick 121 by the user. Alternatively, the user may access a remote control 122 and set a target position for the trailer 140 and the drive system 130 can then drive the wheels of the trailer 140 to relocate the trailer 140 to the target position according to forces transferred to the joystick 121 by the remote control 122.

Furthermore, the drive system 130 can trigger a primary motor 131, a set of secondary motors, a primary airbrake system 107, and/or a set of secondary airbrake systems to manipulate the driven wheels of the trailer 140 and to relocate the trailer 140 to a new position. At the end of manual mode, the controller 150 can identify a coupling event at the kingpin 110 with the hitch of a tow vehicle, deactivate the manual mode, and enter a tow mode.

2.2 Tow Mode

In tow mode, the controller 150 can detect conditions of the trailer 140 such as: a direction of motion of the trailer 140 (e.g., a forward direction, a reverse direction); a (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); and a charge state of each battery pack coupled to the trailer 140 (e.g., a status, a level, a percentage). The controller 150 can then: calculate a target preload force proportional to and/or inversely proportional to the condition of the trailer 140; and trigger a motor, arranged in the drive system, to increase torque output and/or reduce torque output in the direction of motion of the trailer 140 to decrease a difference between the target preload force and a total force applied to the kingpin 110 (e.g., an actual force) to control the trailer 140 in conjunction with the tow vehicle.

Additionally, the controller 150 can monitor forces and accelerations of the trailer 140 at the kingpin 110 to detect abusive movement events in "real-time" and to set the target wheel speeds of the trailer 140 to null to slow motion of the trailer 140, and thereby enable the user to maintain manual control of the joystick. At the end of tow mode, the controller 150 can identify a decoupling event at the kingpin 110 with the hitch of a tow vehicle, deactivate the tow mode, and then enter either the manual mode or the hibernation mode.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin 110); to reduce emissions by the tow vehicle; to decrease fuel consumption by the tow vehicle; to extend the life of each battery pack coupled to the trailer 140; and to enable a driver of the tow vehicle to apply minimal to no brake force to the trailer 140 in tow mode.

3. Method

Figure 4:
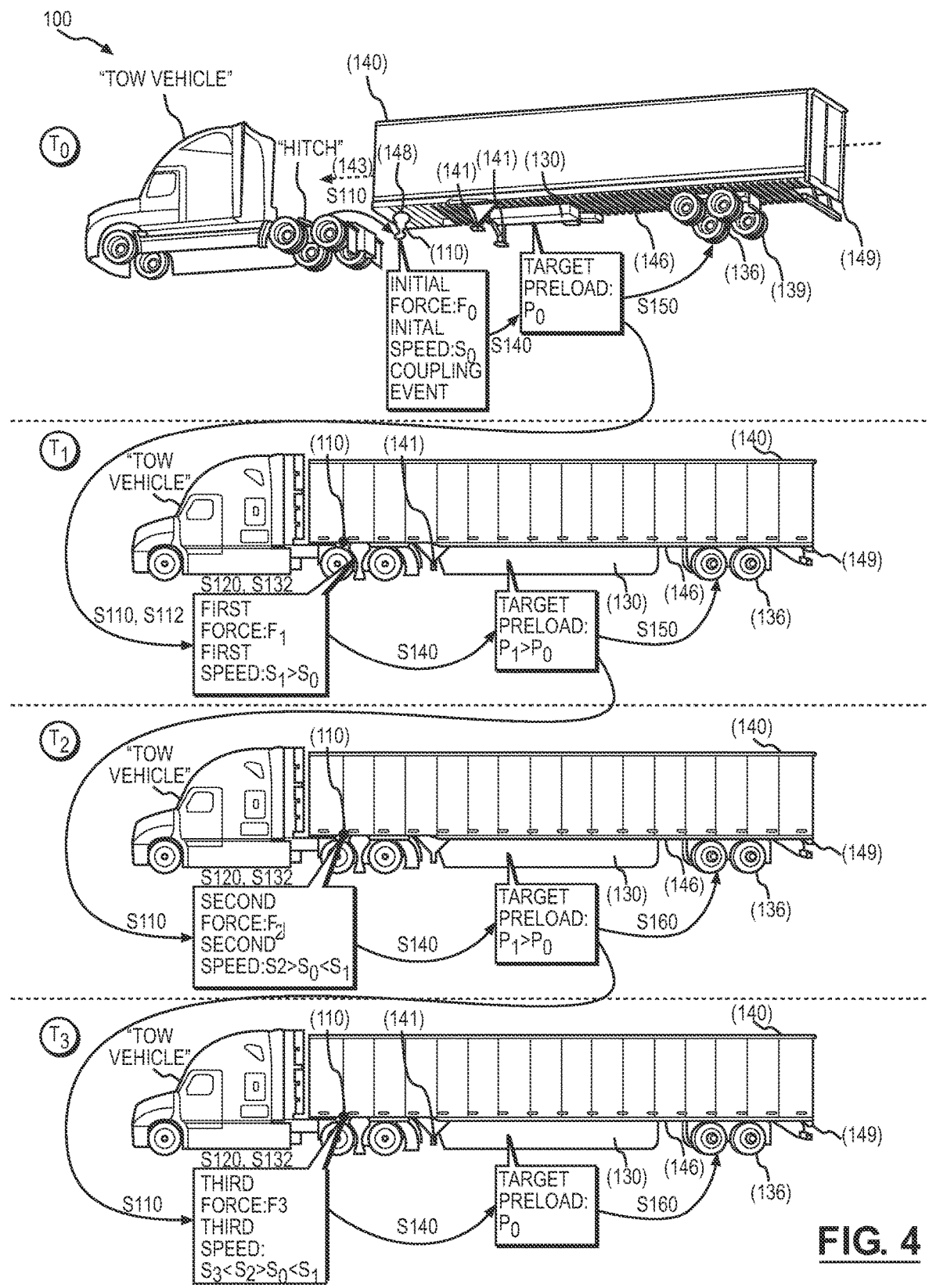
FIG. 4 is a flowchart representation of a method.
Figure 7B:
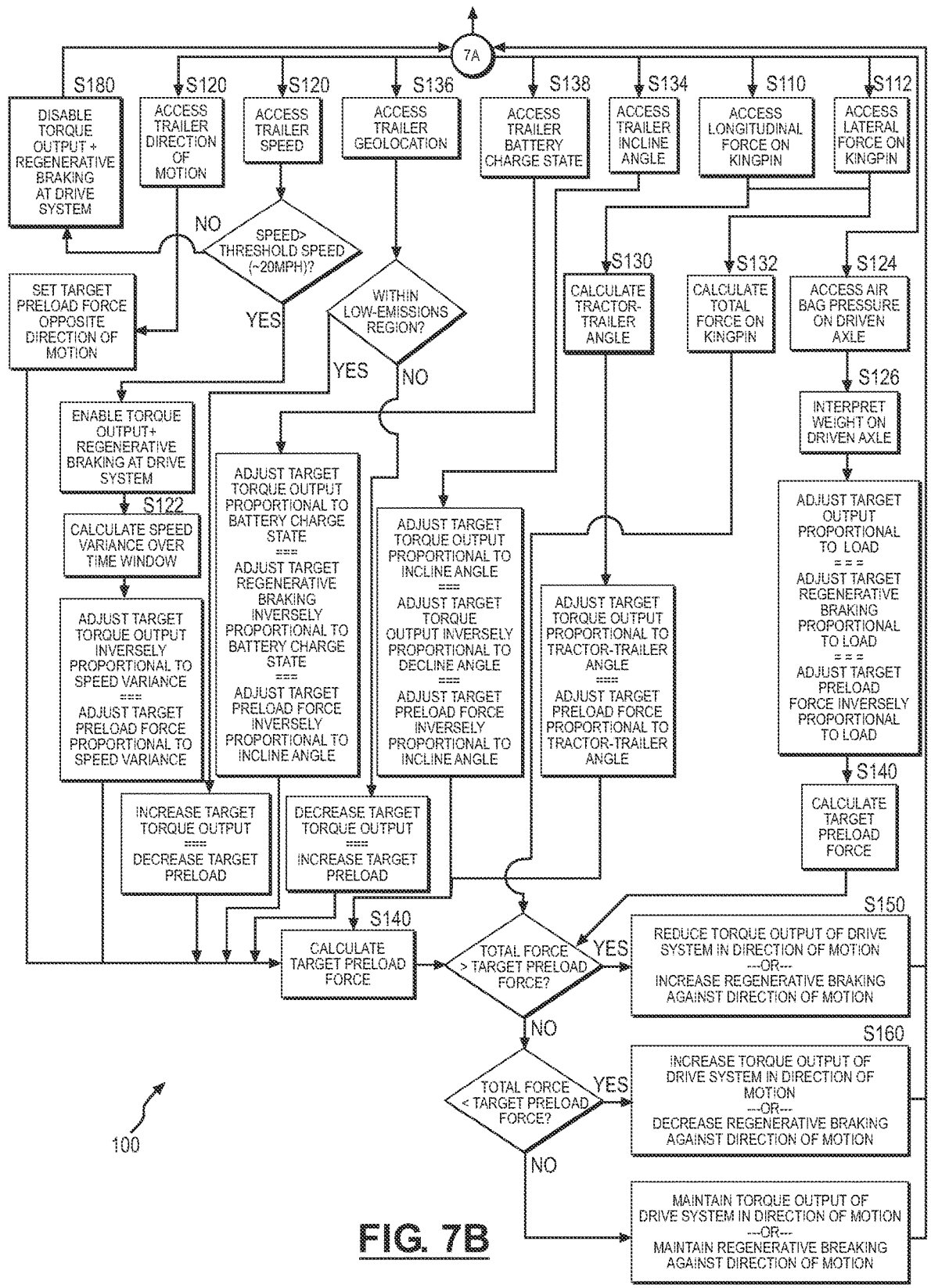
Figure 9:
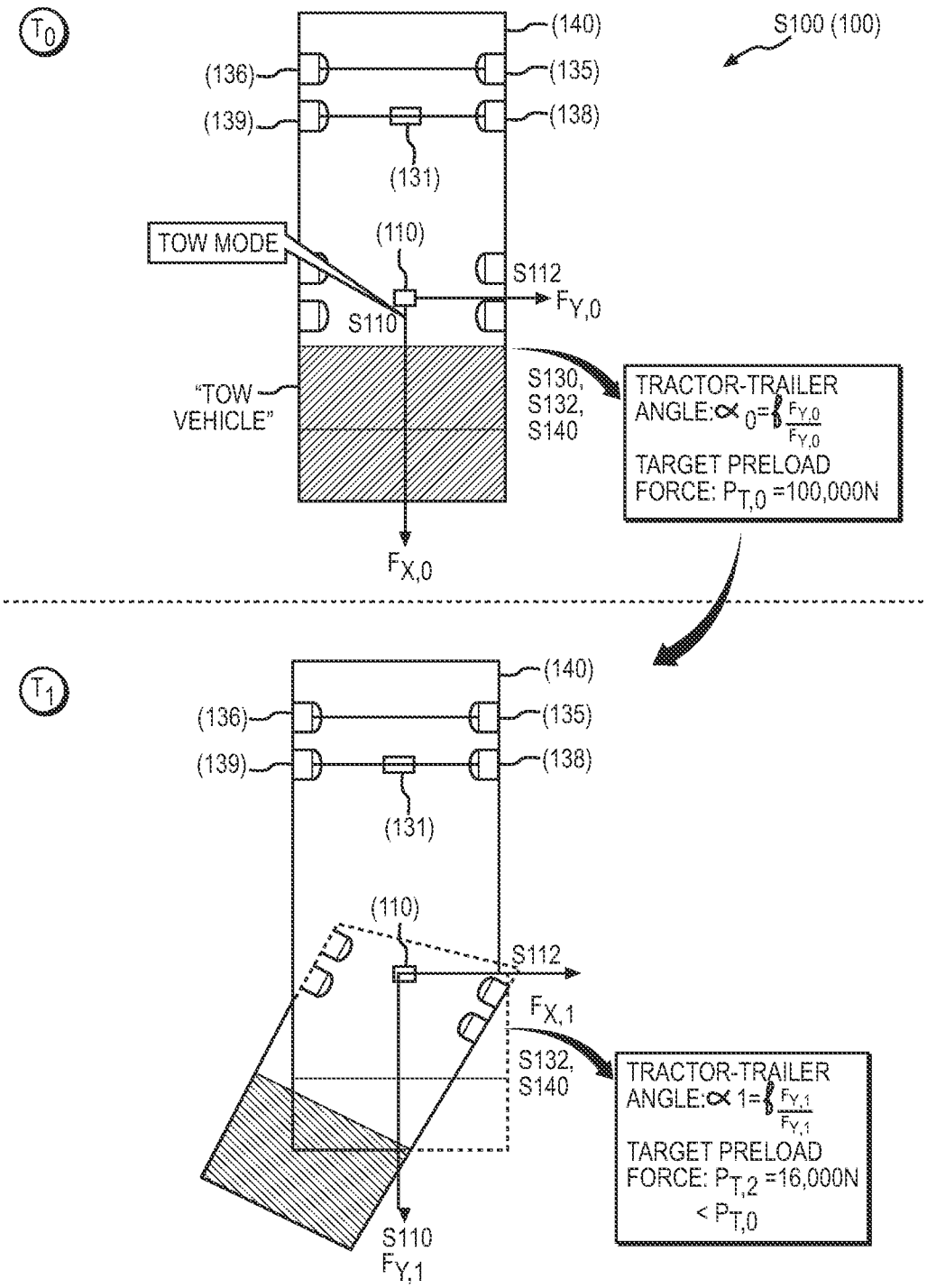
FIG. 9 is a flowchart representation of one variation of the method.

As shown in FIGS. 4, 7B, and 9, a method S100 for dynamic tow of a trailer 140 includes, during a first time period: detecting a first longitudinal force applied to a kingpin 110, arranged on a proximal end of a trailer 140, by a hitch of a tow vehicle in Block S110; detecting a first lateral force applied to the kingpin 110 by the hitch in Block S112; detecting a first speed and a first direction of motion of the trailer 140 in Block S120; calculating a first tractor-trailer 140 angle, between longitudinal axes of the trailer 140 and the tow vehicle, based on the first longitudinal force and the first lateral force in Block S130; calculating a first total force, applied to the kingpin 110 by the hitch, based on the first longitudinal force and the first lateral force in Block S132; calculating a first target preload force opposite the first direction of motion and proportional to the first tractor-trailer 140 angle in Block S140; and triggering a motor, arranged in a drive system located proximal a distal end of the trailer 140, to reduce torque output in the first direction of motion to decrease a first difference between the first total force and the first target preload force in Block S150, in response to the first speed of the trailer 140 exceeding a first threshold speed and in response to the first total force falling below the first target preload force.

The method S100 further includes, during a second time period: detecting a second longitudinal force applied to the kingpin 110 by the hitch in Block S110; detecting a second lateral force applied to the kingpin 110 by the hitch in Block S112; detecting a second speed and a second direction of the trailer 140 in Block S120; calculating a second total force applied to the kingpin 110 by the hitch based on the second longitudinal force and the second lateral force in Block S132; calculating a second target preload force opposite the second direction of motion and proportional to the second tractor-trailer 140 angle in Block S140; and triggering the motor, arranged in the drive system, to increase torque output in the second direction of motion to decrease a second difference between the second total force and the second target preload force in Block S160, in response to the second speed exceeding the first threshold speed and in response to the second total force exceeding the second target preload force.

3.1 Variation: Target Preload Force+Incline Angle

One variation of the method S100 includes, during a first time period: detecting a direction of motion of the trailer 140 in Block S120; detecting a first force applied to a kingpin 110 arranged on a proximal end of the trailer 140, by a hitch of a tow vehicle in Block S132; detecting a first incline angle of the trailer 140 in Block S134; calculating a first target preload force opposite the direction of motion and inversely proportional to the first incline angle in Block S140; and, in response to the first force falling below the first target preload force, triggering a motor 131, arranged in a drive system 130 located proximal a distal end of the trailer 140, to increase torque output in the direction of motion to decrease a first difference between the first force and the first target preload force in Block S160.

This variation of the method S100 further includes, during a second time period: detecting a second force applied to the kingpin 110 by the hitch of the tow vehicle in Block S132; detecting a decline angle of the trailer 140 in Block S134; calculating a second target preload force opposite the direction of motion of the tow vehicle and inversely proportional to the decline angle in Block S140; and, in response to the second force falling below the second target preload force, triggering the motor 131 to increase torque output opposite the direction of motion to decrease the second difference between the second force and the second target preload force in Block S160.

3.2 Variation: Target Preload Force+Tractor-Trailer Angle+Incline Angle

One variation of the method S100 includes during a first time period: detecting a first force applied to a kingpin 110, arranged on a proximal end of a trailer 140, by a hitch of a tow vehicle in Block S132; detecting a first direction of motion of the trailer 140 in Block S120; detecting a first tractor-trailer 140 angle between longitudinal axes of the trailer 140 and the tow vehicle in Block S130; detecting a first incline angle of the trailer 140 in Block S134; calculating a first target preload force opposite the first direction of motion, proportional to the first tractor-trailer 140 angle, and inversely proportional to the first incline angle in Block S140; and, in response to the first force falling below the first target preload force, triggering a motor 131, arranged in a drive system 130 located proximal a distal end of the trailer 140, to reduce torque output in the first direction of motion to decrease a first difference between the first force and the first target preload force in Block S150.

This variation of the method S100 further includes, during a second time period: detecting a second force applied to the kingpin 110 by the hitch in Block S132; detecting a second direction of motion of the trailer 140 in Block S120; detecting a second tractor-trailer 140 angle between longitudinal axes of the trailer 140 and the tow vehicle in Block S130; detecting a second incline angle of the trailer 140 in Block S134; calculating a second target preload force opposite the second direction of motion, proportional to the second tractor-trailer 140 angle, and inversely proportional to the second incline angle in Block S140; and, in response to the second force exceeding the second target preload force, triggering the motor 131 to increase torque output in the second direction of motion to decrease a second difference between the second force and the second target preload force in Block S160.

4. Kingpin

The kingpin 110 includes: a head 117; a shank 116; a base in; a set of fasteners 118; a geolocation module; a wireless communications module; and a suite of sensors 119 including force sensors (e.g., a strain gauge, an IMU, a load cell), optical sensors (e.g., a one-dimensional depth sensor, a LIDAR sensor, an RGB camera), and/or inertial sensors (e.g., an IMU, an accelerometer, a gyroscope). The kingpin 110 is arranged on a proximal end 148 of a trailer 140, is characterized by a unitary steel alloy structure, and is configured to interface with a hitch of a tow vehicle (e.g., a trailer 140 tractor, a semi, a semitruck), as shown in FIGS. 1A, 1B, 1C, 2A, 2B, 2C, 6A, 6B, and 6C.

In one implementation, the kingpin 110 is coupled to a floor 146 of a trailer 140 and is configured to transfer vertical loads from the trailer 140 into a hitch of a tow vehicle. In this implementation, the set of sensors 118 are configured to: output signals representing forces applied to the kingpin 110 (e.g., via the force sensors 119); output signals representing inertial conditions of the trailer 140 (e.g., via the inertial sensors 119); output signals representing a location of the trailer 140 (e.g., via the geolocation module); and transmit these force data, inertial conditions data, weight distribution data, and/or geolocation data to a controller 150 via the communications module.

4.1 Head+Shank+Base

Figure 2A:
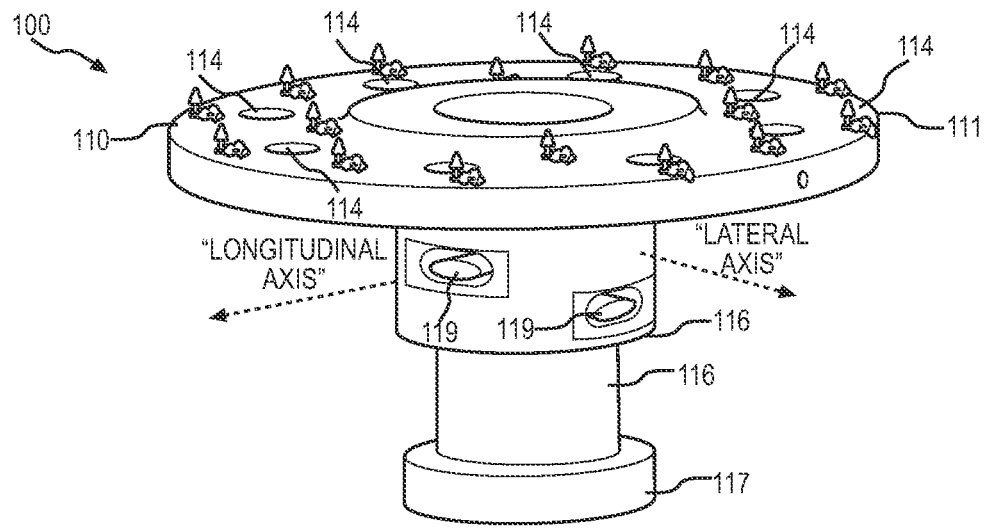
FIGS. 2A, 2B, and 2C are schematic representations of one variation of the system.
Figure 2B:
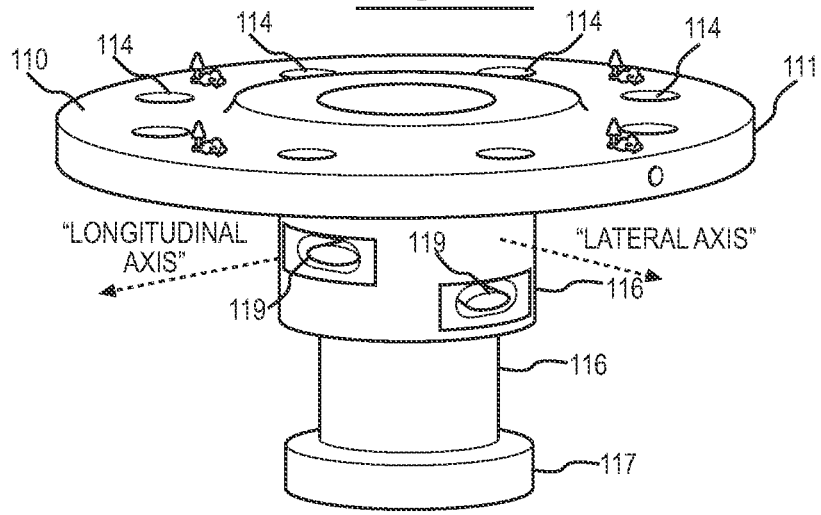
Figure 2C:
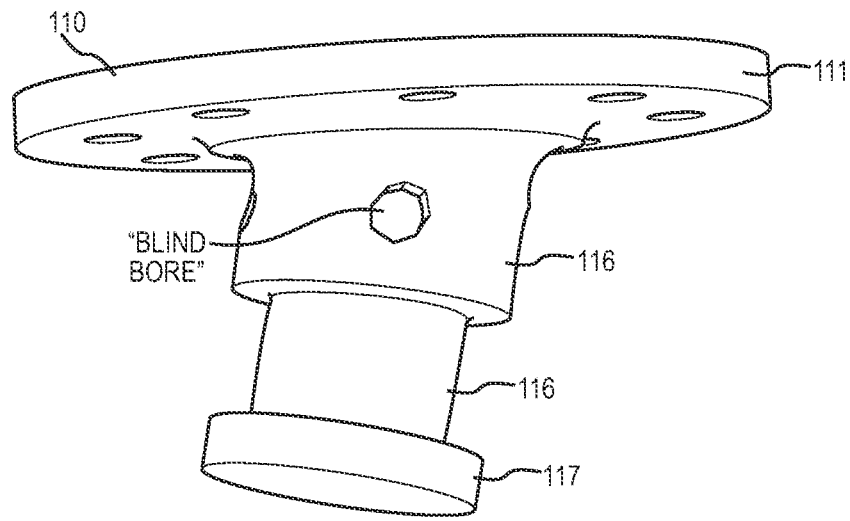

In one implementation, as shown in FIGS. 2A, 2B, and 2C, the kingpin 110 includes: a head 117 defining a first diameter; a shank 116 defining a second diameter less than the first diameter; and the base in defining a third diameter greater than the first diameter of the head 117 and the second diameter of the shank 116. In this implementation, the base in further defines a set of through-bores 114 arranged radially about the shank 116 and configured to receive a set of fasteners 118 to couple the kingpin 110 to a floor 146 of the trailer 140 and thus, fasten the kingpin 110 to the trailer 140. Further, the shank 116 is configured to transiently couple to the hitch of the tow vehicle (e.g., a fifth wheel arranged on a tow vehicle).

In one variation, the kingpin 110: defines a first sensor receptacle extending parallel to a lateral axis of the trailer 140; and defines a second sensor receptacle extending parallel to a longitudinal axis of the trailer 140. Further, a first sensor (e.g., a strain gauge) is arranged in the first sensor receptacle and configured to output a signal representing shear forces in the kingpin 110 parallel to the lateral axis and a second sensor (e.g., a strain gauge) is arranged in the second sensor receptacle and configured to output the second signal representing shear forces in the kingpin 110 parallel to the longitudinal axis.

In another variation, the shank 116 defines a first sensor receptacle extending parallel to a lateral axis of the trailer 140; and defines a second sensor receptacle extending parallel to a longitudinal axis of the trailer 140. Further, a first sensor (e.g., a strain gauge) is arranged in the first sensor receptacle and configured to output a signal representing shear forces in the kingpin 110 parallel to the lateral axis and a second sensor (e.g., a strain gauge) is arranged in the second sensor receptacle and configured to output the second signal representing shear forces in the kingpin 110 parallel to the longitudinal axis.

In yet another variation, the shank 116 defines: a first blind bore extending parallel to a lateral axis of the trailer 140; and a second blind bore extending parallel to a longitudinal axis of the trailer 140 and laterally offset from the first blind bore. Further, a first sensor (e.g., a strain gauge) is arranged in the first blind bore configured to output a signal representing shear forces in the kingpin 110 parallel to the lateral axis and a second sensor (e.g., a strain gauge) is arranged in the second blind bore and configured to output a signal representing shear forces in the kingpin 110 parallel to the longitudinal axis. Thus, the first blind bore and the second blind bore cooperate to achieve a target wall thickness of the shank 116 (e.g., reduce the wall thickness) and increase shear force sensitivity of the force sensors arranged within the first- and second-blind bores.

4.2 Sensors

Generally, the kingpin 110 can include a set of sensors 119—such as force sensors (e.g., a strain gauge, an IMU, a load cell), optical sensors (e.g., a one-dimensional depth sensor, a LIDAR sensor, an RGB camera), and/or inertial sensors (e.g., an IMU, an accelerometer, a gyroscope)—coupled to the base in, the shank 116, and/or the head 117 of the kingpin 110.

Furthermore, each sensor in the suite of sensors 119 can generate sensor data (e.g., analog values, digital values) in a sense domain such as including: lateral forces applied to the kingpin 110; longitudinal forces applied to the kingpin 110; vertical forces applied to the kingpin 110; locations of the trailer 140; speeds of the trailer 140; battery charge states; incline angles (e.g., grade of a road) of the trailer 140; accelerations of the trailer 140; and/or tractor-trailer 140 angle of the trailer 140, etc. Each sensor can then transmit these sensor data to the controller 150.

In one example, a set of (e.g., two) sensors 119 are mounted to the base ni of the kingpin 110. The first sensor includes a first strain gauge extending laterally across a front face of the kingpin 110; and configured to output a first signal corresponding to shear forces applied to the kingpin 110 parallel to a lateral axis of the trailer 140. The second sensor in the set of sensors includes a second strain gauge extending longitudinally across a side face of the kingpin 110 and configured to output a second signal corresponding to shear forces applied to the kingpin 110 parallel to a longitudinal axis of the trailer 140.

In another example, a set of sensors 119 are mounted to the shank 116 of the kingpin 110.

4.2.1 Force Sensors

In one implementation, the kingpin 110 can include a set of force sensors 119. In this implementation, the kingpin 110 can include: a first sensor 119 configured to output signals representing lateral forces (e.g., loads) applied to the kingpin 110; and a second sensor 119 configured to output signals corresponding to longitudinal forces (e.g., loads), parallel to a longitudinal axis 143 of the trailer 140, applied to the kingpin 110.

In one variation, the kingpin 110 can include a set of (e.g., two) force sensors mounted to the base in of the kingpin 110. A first sensor, in the set of force sensors: includes a first strain gauge extending laterally across a front face of the kingpin 110; and is configured to output a first signal corresponding to shear forces applied to the kingpin 110 parallel to a lateral axis of the trailer 140. A second sensor, in the set of force sensors, includes a second strain gauge extending longitudinally across a side face of the kingpin 110, adjacent the front face of the kingpin 110, and configured to output a second signal corresponding to shear forces applied to the kingpin 110 parallel to a longitudinal axis of the trailer 140.

Additionally or alternatively, the kingpin 110 can include a third sensor 119 (e.g., a third strain gauge) configured to output signals representing vertical forces applied to the kingpin 110. This sensor 119 can then transmit signals representing a vertical force applied to the kingpin 110 to the controller 150 to identify a coupling event and selectively alternate between a tow mode and a manual mode, as further described below.

4.2.2 Other Sensors

In one implementation, the kingpin 110 can include additional sensors 119, such as other force sensors (e.g., a load cell, an IMU), optical sensors (e.g., a one-dimensional depth sensor, a LIDAR sensor, an RGB camera), proximity sensors (e.g., a Hall effect sensor, a conductive sensor, an inductive sensor), and/or inertial sensors (e.g., an IMU, an accelerometer, a gyroscope) etc.

In one variation, the kingpin 110 can include an inertial measurement unit (e.g., an IMU) configured to output signals representing motion in pitch, roll, and yaw positions of the kingpin 110 and/or angular velocity of the trailer 140. The inertial measurement unit can then transmit these signals to the controller 150.

In another variation, the kingpin 110 can include: a load cell configured to output signals representing tension, compression, pressure, or torque applied to the kingpin 110 and transmit these signals to the controller 150.

In yet another variation, the kingpin 110 can include an accelerometer configured to output signals representing acceleration or speed of the trailer 140 at the kingpin 110. The accelerometer can then transmit these signals to the controller 150.

5. Interface

As shown in FIGURES SA, 5B, 5C, and 5D, the system 100 can include an interface 120 including a joystick 121 and a kingpin 110 interface 123 configured to transiently couple to the kingpin 110 and to transfer forces (e.g., lateral forces, longitudinal forces, vertical forces), applied to the joystick 121, into the kingpin 110.

In one implementation, the interface 120 includes the joystick 121 configured to move within a range of positions and the kingpin 110 interface 123 includes a clamp configured to transiently couple to the kingpin 110 and transfer forces applied to the joystick 121. In this implementation, the joystick 121 is manually manipulated by a user within the range of positions or manipulated by a remote control 122 and the kingpin 110 interface 123 further includes a display configured to present forces applied to the joystick 121 to a user.

In another implementation, the interface 120 includes an analog joystick (e.g., a control stick) configured to move within a range of positions and the analog joystick is manually manipulated by a user or manipulated by a remote control 122 within the range of positions. The interface 120 is configured to transiently couple to the kingpin 110 and transfer forces, applied to the analog joystick, to the kingpin 110. However, the system 100 can include any other type of control stick and include any other type of kingpin 110 interface 123.

6. Trailer+Drive System

As shown in FIGS. 3A, 3B, 3C, and 8A, the trailer 140 includes: a set of rails 147; a drive system 130 (e.g., a bogie); a motor 131; a right wheel 145; a left wheel 144; and landing gear 141.

In one implementation, the trailer 140 includes: a floor 146; a left rail 147 coupled to the floor 146, extending parallel to and laterally offset from a longitudinal centerline 143 of the trailer 140, and defining a first array of engagement features distributed along the left rail and longitudinally offset by a pitch distance; a right rail 147 coupled to the floor 146, extending parallel to and laterally offset from the longitudinal centerline 143 of the trailer 140 opposite the left rail 147, and defining a second array of engagement features distributed along the right rail 147 and longitudinally offset by the pitch distance; and a drive system 130.

In this implementation, the drive system 130 includes: a chassis; a set of latches configured to transiently engage a subset of engagement features, in the first array of engagement features on the left rail 147 and in the second array of engagement features in the right rail 147, to retain the chassis on a distal end of the trailer 140 opposite the kingpin 110; a passive axle 134 including a left passive wheel 135 and a right passive wheel 136; a driven axle 137 adjacent the passive axle 134 and including a left driven wheel 138 and a right driven wheel 139; and a motor 131 mounted to the chassis, coupled to the drive axle 137; and configured to output torque to the left driven wheel 138 and to the right driven wheel 139. The controller 150 is configured to trigger the motor 131 coupled to the left driven wheel 138 and the right driven wheel 139 to output torque in the direction of a force applied to the kingpin 110.

Figure 8A:
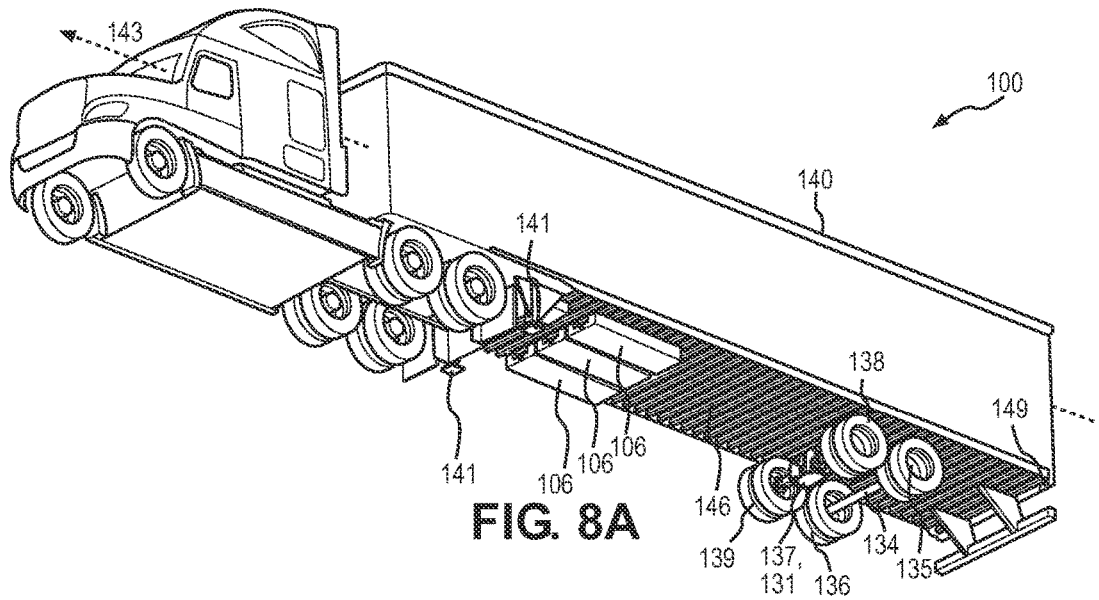
FIGS. 8A, 8B, 8C, and 8D are schematic representations of one variation of the system.
Figure 8B:
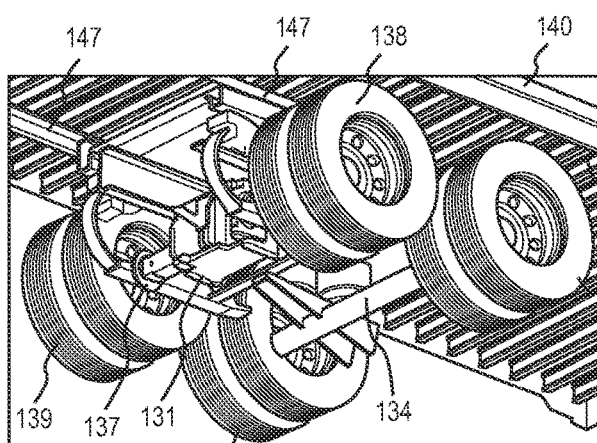
Figure 8C:
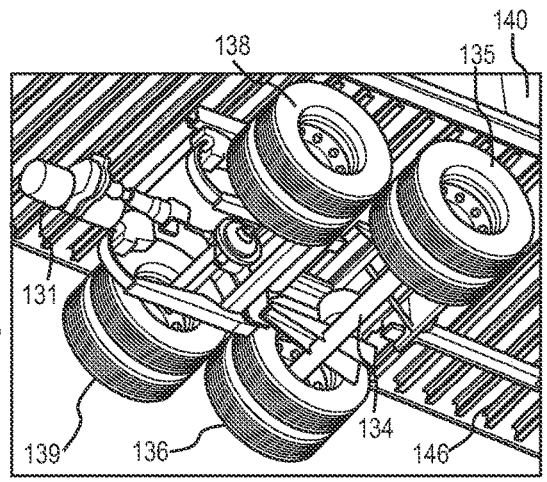

In one variation, the drive system 130 includes a primary motor 131 coupled to the wheels of the driven axle 137. For example, the drive system 130 is arranged on a floor of the trailer 140 146 proximal the distal end 149 of the trailer 140 opposite the kingpin 110 and includes: a passive axle 134 and a driven axle 137 adjacent the passive axle 134. The passive axle 134 includes: a left passive wheel 135 and a right passive wheel 136. The driven axle 137 includes: a left driven wheel 138; a right driven wheel 139; and a primary motor 131 coupled to the left driven wheel 138 and the right driven wheel 139. The drive system 130 is configured to trigger the primary motor 131 to drive the left driven wheel 138 and the right driven wheel 139 and thus, output torque in a tow mode, as shown in FIGS. 8B and 8C.

Furthermore, the system 100 can further include a battery 106 coupled to the floor 146 of the trailer 140 and electrically coupled to the drive system 130. In one variation, the trailer 140 includes a set of battery packs, configured to form the battery 106, coupled to the floor 146 of the trailer 140 and electrically coupled to the drive system 130. In this variation, the controller 150 is configured to detect a charge state (e.g., a status, a level, a percentage) of each battery pack in the battery 106 and calculate a target preload force inversely proportional to the charge state of each battery pack, as further described below.

6.1 Landing Gear

In one implementation, shown in FIG. 5B, the trailer 140 includes a landing gear 141 configured to support the trailer 140. The landing gear 141 includes: a leg coupled to the floor 146 of the trailer 140 along the longitudinal axis of the trailer 140; and a set of wheels 142 (e.g., caster wheels) pivotably coupled to the leg and configured to engage a ground surface below the floor 146 of the trailer 140. The trailer 140 can further include a wheel actuator arranged on the landing gear 141 and configured to transition the set of wheels 142 from a retracted position (e.g., proximal a distal end of the leg) to an extended position (e.g., engaging a ground surface below the floor 146 of the trailer 140) and thereby, enable motion of the trailer 140 in a manual mode in conjunction with the left wheel of the trailer 140, the right wheel 145 of the trailer 140, the left driven wheel 138, and the right driven wheel 139.

Therefore, the controller 150 can trigger the wheel actuator to extend the set of wheels of the landing gear 141 toward a ground surface in a manual mode and retract the set of wheels toward the distal end of the leg of the landing gear 141 at the end of a manual mode and enter a tow mode.

6.2 Other Sensors

In one implementation, the system 100 can include additional sensors 119, such as other force sensors (e.g., a load cell, an IMU), optical sensors (e.g., a one-dimensional depth sensor, a LIDAR sensor, an RGB camera), proximity sensors (e.g., capacitive sensors, inductive sensors, Hall effect sensors), amplifier sensors, pressure sensors, and/or inertial sensors (e.g., an IMU, an accelerometer, a gyroscope) arranged on the trailer 140.

In one variation, an accelerometer is arranged on the trailer 140 proximal the kingpin 110 and is configured to output signals representing accelerations of the trailer 140. The accelerometer can then transmit these signals to the controller 150.

In another variation, a set of distance sensors are arranged on the trailer 140. In this variation, a left distance sensor is arranged on the trailer 140 proximal the left side of the kingpin 110 and is configured to output a first distance signal representing a first distance between the trailer 140 and a left feature on a corresponding left side of the tow vehicle. Further, a right distance sensor is arranged on the trailer 140 proximal the right side of the kingpin 110 and configured to output a second distance signal representing a second distance between the trailer 140 and a right feature on the right side of the tow vehicle. The controller 150 can then access the first distance signal from the left distance sensor and the second distance signal from the right distance sensor; calculate a tractor-trailer 140 angle based on the first distance signal and the second distance signal; and trigger the motor to output torque in response to correspondence between a direction of a force applied to the kingpin 110 and the tractor-trailer 140 angle, as further described below.

7. Controller

The controller 150 is coupled to sensors 119 within the system 100 and executes methods and techniques described below to: calculate a direction and a magnitude of each force applied to the kingpin 110; identify a coupling and/or a decoupling event between a hitch (e.g., a fifth wheel) of a tow vehicle (e.g., a tractor-trailer) and the kingpin 110 based on these forces; trigger a primary motor 131 and a primary airbrake system 107 to manipulate driven wheels of the trailer 140 in a manual mode; calculate a target preload force as a function of a condition of the trailer 140 (e.g., a speed, an incline angle, a tractor-trailer angle, a location, a charge state of a battery) in a tow mode; trigger the primary motor 131, arranged in the drive system, to selectively reduce torque output and/or increase torque output to decrease a difference between each force and the target preload force in the tow mode; and identify errors at the kingpin 110 (e.g., abusive movement, sensor 119 failure, unauthorized user).

In one example, the controller 150 implements a Kalman filter to calculate the target preload force based on signals output from the sensors and triggers the primary motor 131 to selectively reduce torque output and/or increase torque output to decrease a difference between each force and the target preload force in the tow mode.

8. Kingpin Setup Period

Generally, the system 100 can include a lockout system (e.g., a mechanical propulsion lockout system, an electrical lockout system) to prevent an unauthorized user, device, or vehicle from accessing the kingpin 110, the trailer 140, and/or any data (e.g., force data, voltage data, controller area network data) associated with the trailer 140.

In one implementation, as shown in FIG. 7A, during the setup period, the controller 150 can: enter a hibernation mode; detect a coupling event between the kingpin 110 and a tow vehicle in Block S116; and, in response to detecting the coupling event between the kingpin 110 and the tow vehicle, trigger the wireless communication module arranged on the trailer 140 to transmit wireless interrogation signals to nearby devices (e.g., within a threshold distance of the trailer 140) in Block S118. Then, the controller 150 can access an identifier broadcast by a device and, in response to detecting the identifier in a database of identifiers of approved devices, enter a tow mode. Alternatively, in response to detecting absence of the identifier in the database, the controller 150 can enter a hibernation mode and disable torque output by the motor 131 in hibernation mode or enter an antitheft mode and trigger the motor 131 to output a braking torque to prevent unauthorized access to the kingpin 110 and the trailer 140 in Block S150.

In one variation, a user (e.g., a driver, an operator) may execute a sequence of steps or manually shift an external switch on the trailer 140 from a closed position to an open position and the controller 150 can then deactivate a hibernation mode and enter a tow mode.

8.1 Wired Connection Lockout: Hibernation Mode to Tow Mode

In one implementation, during the setup period, a user (e.g., a driver, an operator) may manually execute a sequence of steps or shift an external switch on the trailer 140 from a closed position to an open position, and the controller 150 can then deactivate the hibernation mode and enter a tow mode.

In one variation, a driver may couple a hitch of a tow vehicle to the kingpin 110 and then execute a particular sequence of steps such as applying the brakes of the tow vehicle for a duration of time, turn the steering wheel of the tow vehicle in a particular direction, and/or press a series of buttons within the tow vehicle. Then, in response to detecting the particular sequence of steps, the controller 150 can: deactivate the hibernation mode; and enter a tow mode.

In another variation, the trailer 140 can include an external switch on the proximal end 148 of the trailer 140 and accessible by an operator of the trailer 140. The operator may then manually shift the external switch from a closed position to an open position. Then, the controller 150 can: detect a force applied to the kingpin 110 by the hitch of a tow vehicle via a force sensor; and, in response to detecting the force applied to the kingpin 110, identify the force as a coupling event with the tow vehicle, deactivate the hibernation mode, and enter a tow mode.

In yet another variation, the battery is electrically coupled to a charge station (e.g., via a power cable) and the operator may manually decouple the battery from the charge station by disconnecting the power cable from the battery. Then, the controller 150 can: detect a force applied to the kingpin 110 by the hitch of a tow vehicle via a force sensor; and, in response to detecting the force applied to the kingpin 110, identify the force as a coupling event with the tow vehicle, deactivate the hibernation mode, and enter a tow mode.

Therefore, a user (e.g., a driver, an operator) may manually execute a particular sequence of steps, shift an external switch of the trailer 140, and/or manually decouple the battery from a charge station during the setup period and the controller 150 can deactivate the hibernation mode and enter a tow mode.

8.2 Wireless Connection Lockout: Hibernation Mode to Tow Mode

In one implementation, in Block S118, in response to detecting a coupling event between the kingpin 110 and the hitch of a tow vehicle, the controller 150 can trigger the wireless communication module arranged on the trailer 140 to transmit wireless interrogation signals to nearby devices (e.g., within a threshold distance of the trailer 140). Then, the controller 150 can access an identifier broadcast by a device and, in response to detecting the identifier in a database of identifiers of approved devices, enter a tow mode, as shown in FIG. 7A.

In one variation, the trailer 140 can include a radio frequency identification tag (e.g., an RFID tag) or a near-field communication chip (e.g., an NFC chip) and a user may access a device (e.g., a mobile phone, a tablet, a computing device) configured to read a particular radio frequency associated with the RFID tag or the NFC chip on the trailer 140 and locate the device within a threshold distance of the trailer 140. The device can then implement a handshake protocol with the wireless communication module on the trailer 140 and enter a tow mode.

For example, during the setup period, a driver of a tow vehicle may access a mobile phone configured to read data stored on RFID tags and locate the mobile phone within a threshold distance (e.g., three feet) of an RFID tag on the trailer 140. The mobile phone can then implement a handshake protocol with the RFID tag on the trailer 140 and, in response to detecting an identifier from the mobile phone associated with the RFID tag, the controller 150 can enter a tow mode.

Furthermore, the controller 150 can repeat methods and techniques described above to identify a decoupling event with a tow vehicle, deactivate the tow mode, and enter the hibernation mode.

Therefore, the controller 150 can access identifiers broadcast by devices proximal the trailer 140 and leverage a database of identifiers of approved devices to deactivate the hibernation mode and enter a tow mode.

8.3 Wireless Connection Lockout: Antitheft Mode

In one variation, as shown in FIG. 7A, the trailer 140 can include a wireless communication module: arranged proximal the kingpin 110; configured to broadcast wireless interrogation signals to devices within a threshold distance of the trailer 140; and receive identifiers from these devices. The controller 150 can then: access a database of identifiers of approved devices; verify presence of these identifiers within the database; and enter a tow mode. Alternatively, the controller 150 can: verify absence of these identifiers within the database; enter an antitheft mode; and trigger the motor 131 to output a braking torque to prevent unauthorized access to the kingpin 110 and the trailer 140 in Block S150.

For example, during the setup period, the controller 150 can: detect a coupling event between a tow vehicle and the kingpin 110 based on an initial signal from the first sensor 119; and, in response to detecting the coupling event between the tow vehicle and the kingpin 110, trigger the wireless communication module to transmit a wireless interrogation signal to devices within a threshold distance of the trailer 140. The controller 150 can then access an identifier, broadcast by a device (e.g., a tablet), received by the wireless communication module responsive to the wireless interrogation signal. In response to detecting absence of the identifier in the database of identifiers of approved devices, the controller 150 can: enter an antitheft mode; access a first signal from the first sensor representing a lateral force applied to the kingpin 110; access a second signal from the second sensor representing a longitudinal force applied to the kingpin 110; calculate a direction and a magnitude of a force applied to the kingpin 110 by the hitch of the tow vehicle based on the first signal and the second signal; and trigger the motor to output a braking torque opposite the direction and proportional to the magnitude.

Therefore, the controller 150 can access identifiers broadcast by devices proximal the trailer 140 and leverage a database of identifiers of approved devices to enter an antitheft mode and trigger the motor to output a braking torque and thereby, prevent unauthorized access, modification, movement, or theft of the kingpin 110 and/or the trailer 140.

9. Manual Mode

Generally, the controller 150 can identify a decoupling event between the kingpin 110 and a tow vehicle and deactivate the tow mode. Then, a user or a machine can couple the interface 120 to the shank 116 of the kingpin 110 and the controller 150 can enter a manual mode (e.g., tow vehicle less control of the trailer 140). In manual mode, the drive system 130 can trigger the primary motor 131 to drive the left wheel 144 and the right wheel 145 of the trailer 140 according to target wheel speeds to locate the trailer 140 in a target position in Block S190.

Furthermore, at the start of the manual mode, the controller 150 can trigger the wheel actuator to extend the set of wheels of the landing gear 141 toward a ground surface below the floor 146 of the trailer 140. The controller 150 can then: access a signal from a set of force sensors 119; detect a null vertical force applied to the kingpin 110 based on the signal; and activate a manual mode in response to detecting the null vertical force. The controller 150 can calculate a maximum wheel speed for a left wheel and a right wheel of the trailer 140 and thereby, limit the swing radius (e.g., pivot radius) of the trailer 140 in manual mode. At the end of manual mode, the controller 150 can trigger the wheel actuator to retract the set of wheels of the landing gear 141 toward a distal end of a leg of the landing gear 141.

Figure 10:
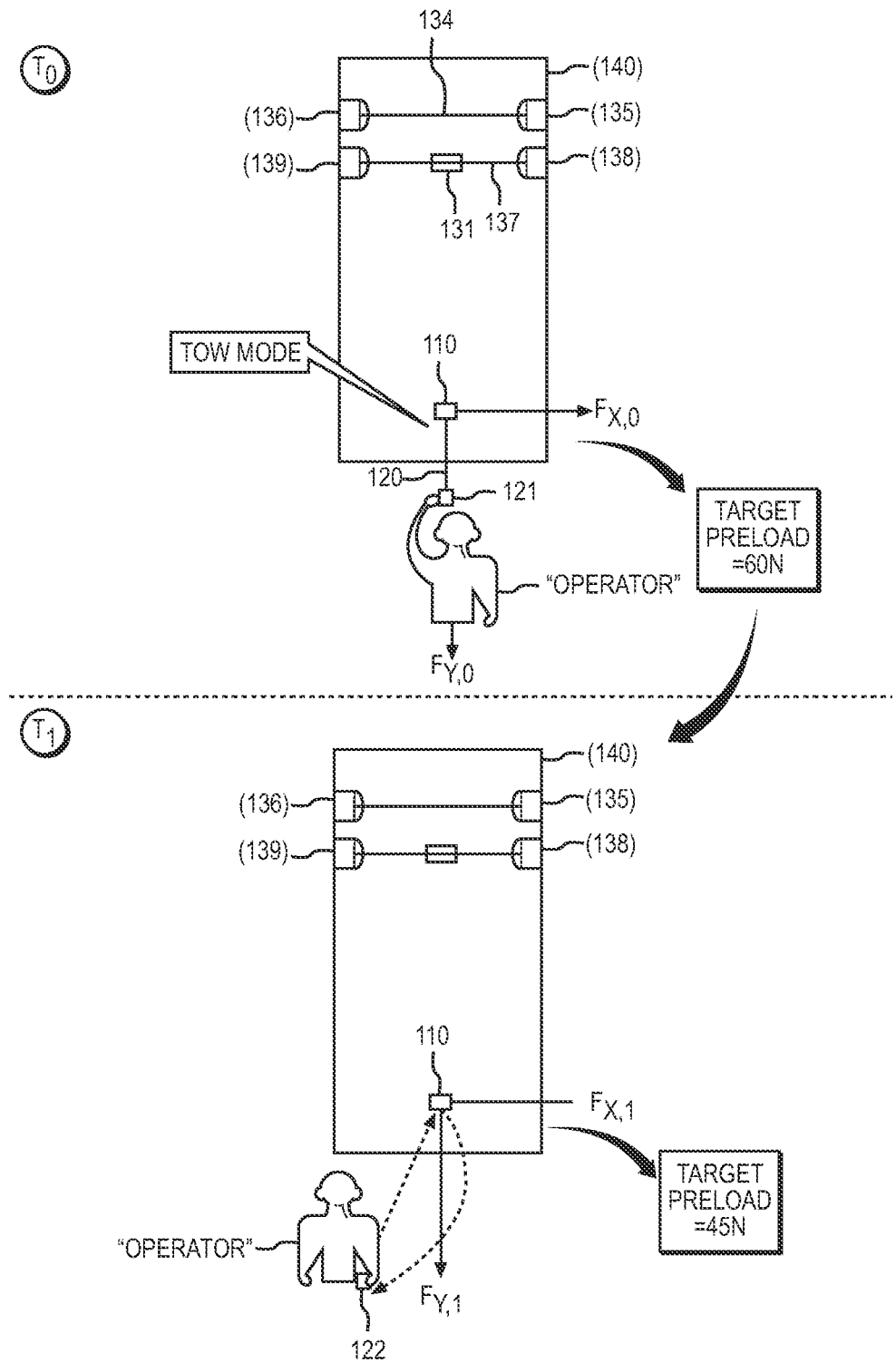
FIG. 10 is a schematic representation of one variation of the system.

In one implementation, shown in FIGS. 10 and 7A, the controller 150 can: access a signal from the set of sensors 119 in Block S170; based on the signal, calculate a first direction and a first magnitude of a first force applied to the kingpin 110 via the joystick 121 by a user or a remote control 122 communicatively coupled to the joystick 121 in Block S170; calculate a target left wheel speed of a left wheel 144 of the trailer 140 proportional to the first magnitude in Block S174; calculate a target right wheel speed of a right wheel 145 of the trailer 140 proportional to the first magnitude, the target right wheel speed differing from the target left wheel speed based on the first direction in Block S176; and serve the target left wheel speed and the target right wheel speed to the drive system 130 arranged proximal a distal end 149 of the trailer 140 opposite the kingpin 110 in Block S178. The drive system 130 can then trigger the motor 131 to drive a left driven wheel 138 and a right driven wheel 139 of the trailer 140 in Block S190.

9.1 Wireless Connection Lockout: Hibernation Mode to Manual Mode

In one variation, the interface 120 can include a wireless transmitter configured to broadcast an identifier (e.g., a barcode, a number, a digital key) to a wireless receiver arranged on the proximal end of the trailer 140 and configured to receive identifiers from the interface 120. The controller 150 can then verify receipt of the identifier to selectively enter a manual mode and/or a tow mode.

For example, during the setup period, the interface 120 can broadcast a first identifier (e.g., 126374958). The controller 150 can then: access the identifier (e.g., 126374958) from the interface 120 via the wireless receiver; and, in response to verifying receipt of the identifier, enter a tow mode to calculate a maximum wheel speed. Once the controller 150 calculates the maximum wheel speed, the interface 120 can broadcast a second identifier (e.g., 56123379). The controller 150 can then: access the second identifier (e.g., 56123379) from the interface 120 via the wireless receiver; and, in response to verifying receipt of the identifier, enter a manual mode. Thus, the controller 150 can verify receipt of identifiers to selectively enter a manual mode and/or a tow mode.

9.1.1 Maximum Wheel Speed

In one variation, upon verification of receipt of an identifier, the controller 150 can: enter a tow mode; pulse the motor 131 to rotate the right wheel 145 and the left wheel 144 of the trailer 140; and access an acceleration of the trailer 140 at the kingpin 110 (e.g., via an accelerometer). The controller 150 can then leverage the acceleration to calculate a maximum wheel speed for the left wheel 144 and the right wheel 145 of the trailer 140 and thereby, limit the swing radius (e.g., pivot radius) of the trailer 140 in manual mode.

For example, during the setup period, in response to verifying receipt of the identifier, the controller 150 can enter a tow mode. In tow mode, the controller 150 can: pulse the primary motor 131 to rotate the left wheel 144 and the right wheel 145 of the trailer 140 by a rotation distance less than ten degrees of a full rotation; access a signal representing an initial acceleration of the trailer 140 at the kingpin 110 from an inertial sensor 119 (e.g., an accelerometer); and interpret a distance between the kingpin 110 and the drive system 130 based on the signal. The controller 150 can then calculate a maximum wheel speed proportional to the distance and implement methods and techniques described above to enter a manual mode. Once the kingpin 110 is in manual mode, the controller 150 can: calculate the target left wheel speed of the left wheel 144 of the trailer 140 less than the maximum wheel speed; and calculate the target right wheel speed of the right wheel 145 of the trailer 140 less than the maximum wheel speed.

Additionally or alternatively, the controller 150 can implement a short-range wireless communication protocol to: broadcast reference signals from a transmitter in the interface to a receiver arranged on the drive system 130; and record transmit and receive durations (or "time of arrival receipts") for these reference signals. The controller 150 can then transform a reference signal into a time-based distance between the interface 120 and the drive system 130 and calculate the maximum wheel speed proportional to this time-based distance.

For example, the interface 120 can include a transmitter configured to transmit a reference signal to the drive system 130, the drive system 130 including a receiver arranged on the drive system 130 and configured to receive the reference signal from the transmitter. Then, during the setup period, the controller 150 can: record a time of arrival receipt of the reference signal arriving at the receiver arranged on the drive system 130; transform the time of arrival receipt into a distance between the kingpin 110 and the drive system 130; and calculate a maximum wheel speed proportional to the distance. The controller 150 can then implement methods and techniques described above to enter a manual mode. Once the kingpin 110 is in manual mode, the controller 150 can: calculate a target left wheel speed of the left wheel 144 of the trailer 140 less than the maximum wheel speed; and calculate a target right wheel speed of the right wheel 145 of the trailer 140 less than the maximum wheel speed.

Therefore, the controller 150 can calculate a maximum wheel speed for the left wheel 144 and the right wheel 145 of the trailer 140 in a tow mode. Additionally, the controller 150 can enter a manual mode to set the maximum wheel speed for the left wheel 144 and the right wheel 145 of the trailer 140 to limit the swing radius of the trailer 140 in manual mode and thus, prevent the trailer 140 from colliding with external objects and the operator of the joystick 121.

9.2 Manual Mode: Manual Joystick+Remote Control

In one variation, the drive system 130 includes a primary motor 131 coupled to the wheels of the driven axle 137. In this variation, the drive system 130 is arranged on a floor of the trailer 140 146 proximal the distal end 149 of the trailer 140 opposite the kingpin 110 and includes a passive axle 134 and a driven axle 137 adjacent the passive axle 134. The passive axle 134 includes a left passive wheel 135 and a right passive wheel 136. The driven axle 137 includes: a left driven wheel 138; a right driven wheel 139; and a primary motor 131 coupled to the left driven wheel 138 and the right driven wheel 139. The drive system 130 can trigger the primary motor 131 to drive the left wheel 144 and the right wheel 145 of the trailer 140 according to target wheel speeds in manual mode.

For example, a user (e.g., a driver, an operator, a yard manager) may wish to relocate a trailer 140 parked in a yard to a new position. Accordingly, the user may: access and clamp (e.g., attach) the interface 120 onto the shank 116 of the kingpin 110 of this trailer 140 parked in the yard and manipulate the joystick 121 in a first direction toward the new position. The kingpin 110 interface 123 can then identify the direction of the joystick 121 as a lateral force applied to the joystick 121 and transfer this lateral force into the shank 116. A force sensor 119 coupled to the shank 116 can then output a signal representing this lateral force and the controller 150 can: calculate a first direction and a first magnitude of the force applied to the kingpin 110; calculate a target left wheel speed of a left wheel 144 of the trailer 140 proportional to the first magnitude; calculate a target right wheel speed of the right wheel 145 of the trailer 140 proportional to the first magnitude, the target right wheel speed differing from the target left wheel speed based on the first direction; and serve these target wheel speeds to the drive system 130. The drive system 130 can then: trigger the left motor to drive the left driven wheel 138 according to the target left wheel speed; and trigger the right motor to drive the right driven wheel 139 according to the target right wheel speed to relocate the trailer 140 to the new position.

Alternatively, the user (e.g., a driver, an operator, a yard manager) may access a remote control 122 communicatively coupled to the interface 120. The user may then set a target position for the trailer 140 at the remote control 122 and the remote control 122 can transmit the target position to the interface 120. The interface 120 can then derive a force from the target position and transfer this force into the shank 116. The controller 150 and the drive system 130 can then implement methods and techniques described above to relocate the trailer 140 to the target position.

Therefore, in manual mode, the user may manually manipulate the joystick 121 and the drive system 130 can drive the wheels of the trailer 140 to relocate the trailer 140 according to forces applied to the joystick 121 by the user. Additionally, the user may access a remote control 122 and set a target position for the trailer 140 and the drive system 130 can drive the wheels of the trailer 140 to relocate the trailer 140 to the target position according to forces transferred to the joystick 121 by the remote control 122.

9.3 Manual Mode: Drive System Variations

Figure 8D:
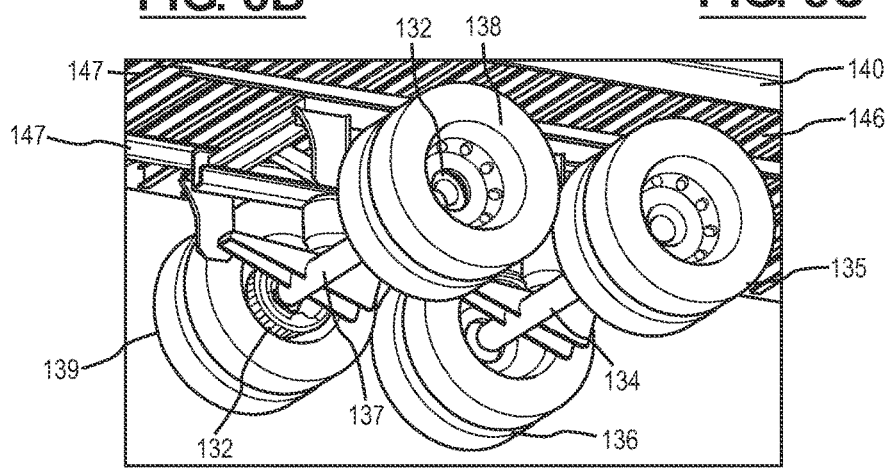

In one variation, shown in FIG. 8D, the drive system 130 includes a set of secondary motors 132 and each motor in the set of secondary motors 132 is coupled to a wheel of the driven axle 137. In this variation, the drive system 130 is arranged on a floor of the trailer 140 146 proximal the distal end 149 of the trailer 140 opposite the kingpin 110 and includes: a passive axle 134 and a driven axle 137 adjacent the passive axle 134. The passive axle 134 includes: a left passive wheel 135 and a right passive wheel 136. The driven axle 137 includes: a left driven wheel 138; a right driven wheel 139; a left motor 132 coupled to the left driven wheel 138; and a right motor 132 coupled to the right driven wheel 139. The drive system 130 can: receive the target right wheel speed and the target left wheel speed from the controller 150; trigger the left motor 132 to drive the left driven wheel 138 according to the target left wheel speed in Block S192; and trigger the right motor 132 to drive the right driven wheel 139 according to the target right wheel speed in Block S194.

Additionally or alternatively, the drive system 130 includes a primary motor 131 coupled to the wheels of the driven axle 137 and the set of secondary motors 132. The drive system 130 further includes: a primary motor 131 coupled to the left driven wheel 138 and the right driven wheel 139; a left motor 132 coupled to the left driven wheel 138; and a right motor 132 coupled to the right driven wheel 139. The drive system 130 can then: receive the target right wheel speed and the target left wheel speed from the controller 150; trigger the primary motor 131 to drive the left wheel and the right wheel according to the first direction and the first magnitude in Block S190; and selectively trigger the left motor 132 and the right motor 132 according to a difference between the target left wheel speed and the target right wheel speed in Block S196.

Figure 7C:
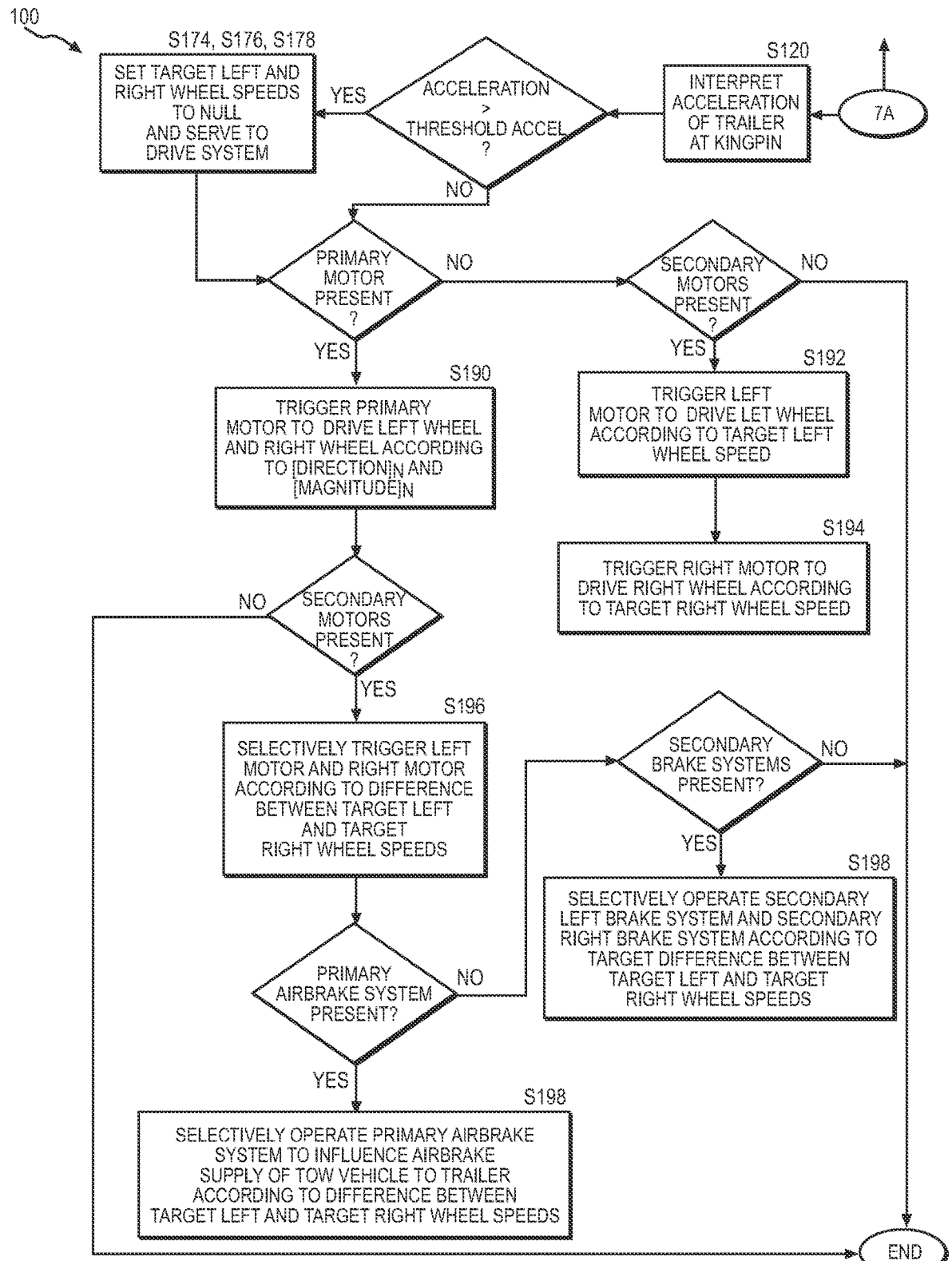

In yet another variation, the drive system 130 includes a primary motor 131 coupled to the wheels of the driven axle 137 and a primary airbrake system 107 coupled to an airbrake supply of the tow vehicle. In this variation, the drive system 130 is arranged on the floor 146 of the trailer 140 proximal the distal end 149 of the trailer 140 opposite the kingpin 110 and includes a passive axle 134 and the driven axle 137 adjacent the passive axle 134. The passive axle 134 includes: a left passive wheel 135; a right passive wheel 136; and a primary airbrake system 107 configured to couple to an airbrake supply of the tow vehicle. The driven axle 137 includes: a left driven wheel 138; a right driven wheel 139; and a primary motor 131 coupled to the left driven wheel 138 and the right driven wheel 139. The drive system 130 can then: receive the target right wheel speed and the target left wheel speed from the controller 150; trigger the primary motor 131 to drive the left wheel and the right wheel according to the first direction and the first magnitude in Block S190; and selectively operate the primary airbrake system 107 to influence the airbrake supply of the tow vehicle to the trailer 140 according to a difference between the target left wheel speed and the target right wheel speed in Block S198, as shown in FIG. 7C.

Alternatively, the drive system 130 can include a primary motor 131 coupled to the wheels of the driven axle 137, the primary airbrake system 107 coupled to the airbrake supply of the tow vehicle, and a secondary brake system 133 coupled to each wheel of the driven axle 137. The drive system 130 further includes: a secondary left brake system 133 coupled to the left wheel and isolated from the primary airbrake system 107; and a secondary right brake system 133 coupled to the right wheel and isolated from the primary airbrake system 107. The drive system 130 can then: receive the target right wheel speed and the target left wheel speed from the controller 150; trigger the primary motor 131 to drive the left wheel and the right wheel according to the first direction and the first magnitude in Block S190; and selectively operate the secondary left brake system 133 and the secondary right brake system 133 according to a difference between the target left wheel speed and the target right wheel speed in Block S198, as shown in FIG. 7C. Therefore, the drive system 130 can trigger a primary motor 131, a set of secondary motors 132, a primary airbrake system 107, and/or a set of secondary brake systems 133 to manipulate the driven wheels of the trailer 140 and to relocate the trailer 140 to a new position.

9.4 Manual Mode: Joystick Control

In one variation, the controller 150 can access signals from an accelerometer to detect accelerations of the trailer 140 in manual mode and leverage a maximum acceleration (e.g., a threshold acceleration) of the trailer 140 to set the target left wheel speed and the target right wheel speed of the trailer 140. Further, at accelerations greater than the threshold acceleration, the controller 150 can set the target wheel speeds to null (e.g., zero) and the drive system 130 can trigger the motor 131 to slow the motion of the trailer 140 and thereby, prevent a user from losing control of the joystick 121.

For example, the controller 150 can: access a signal from an accelerometer proximal the kingpin 110 and representing an acceleration of the trailer 140; interpret an acceleration of the trailer 140 at the kingpin 110 based on the signal; in response to the acceleration of the trailer 140 exceeding a threshold acceleration, set the target left wheel speed and the target right wheel speed to null; and serve the target left wheel speed and the target right wheel speed to the drive system 130. The drive system 130 can then trigger the primary motor 131 to drive the left wheel according to the null target left wheel speed and the right wheel according to the null target right wheel speed to slow the motion of the trailer 140.

Thus, the controller 150 and the drive system 130 can cooperate to set target wheel speeds and drive the wheels according to these target wheel speeds to enable a user to maintain control of the joystick 121 in manual mode.

9.5 Manual Mode to Tow Mode

At the end of manual mode, the controller 150 can interpret a vertical force applied to the kingpin 110 and identify a coupling event at the kingpin 110 with the hitch of a tow vehicle. The controller 150 can then deactivate the manual mode and activate a tow mode. The controller 150 can then trigger the wheel actuator to transition the set of wheels of the landing gear 141 from the extended position toward the floor of the trailer 140 146 to a retracted position and enter a tow mode.

10. Tow Mode

Generally, the user (e.g., an operator, a driver, a yard manager) or a machine (e.g., a forklift) couples the hitch (e.g., a fifth wheel) of a tow vehicle to the kingpin 110 and the controller 150 can identify a coupling event between the kingpin 110 (e.g., via a signal from a force sensor) and the hitch of the tow vehicle. In particular, the controller 150 can: detect an initial force impulse applied to the kingpin 110; interpret the initial force impulse as a coupling event with the hitch of the tow vehicle; and, in response to interpreting the initial force impulse as the coupling event with the hitch of the tow vehicle, enter a tow mode.

In one implementation, in tow mode, the controller 150 can detect conditions of the trailer 140 such as a including: a direction of motion of the trailer 140; a tractor-trailer 140 angle (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); and a charge state of each battery pack coupled to the trailer 140 etc. The controller 150 can then: calculate a target preload force proportional to and/or inversely proportional to the condition of the trailer 140; and trigger a motor, arranged in the drive system, to increase torque output and/or reduce torque output in the direction of motion of the trailer 140 to decrease a difference between the target preload force and a total force applied to the kingpin 110 (e.g., an actual force) to control the trailer 140 in conjunction with the tow vehicle.

More specifically, during a given time period (e.g., 30 seconds, five minutes, ten minutes, one hour), the controller 150 can: detect a direction of motion of the trailer 140; set a target preload force opposite the direction of motion; detect a speed of the trailer 140; and, in response to the speed exceeding a lower speed limit (e.g., 20 miles per hour, 30 miles per hour) enable torque output and regenerative braking at the drive system 130. Then, the controller 150 can: calculate a speed variance over the time window based on the speed of the trailer 140; adjust target torque output inversely proportional to the speed variance; and adjust the target preload force proportional to the speed variance. The controller 150 can further: detect a location of the trailer 140; retrieve a georeferenced location or a low-emissions region from a drive route assigned to the trailer 140; and, in response to the location falling within the threshold distance of the low-emissions region, increase target torque output and decrease the target preload force. Alternatively, in response to the location falling outside of a threshold distance of the low-emissions region, the controller 150 can decrease target torque output and increase the target preload force.

Additionally, the controller 150 can: detect an incline angle of the trailer 140; adjust target torque output proportional to the incline angle of the trailer 140; and adjust target preload force inversely proportional to the incline angle of the trailer 140. Similarly, the controller can: detect a decline angle of the trailer 140; adjust target torque output inversely proportional to the decline angle of the trailer 140; and adjust the target preload force inversely proportional to the decline angle. The controller 150 can: detect a charge state of a battery pack or the battery coupled to the trailer 140; adjust target torque output proportional to the charge state of the battery pack or the battery; adjust target regenerative braking inversely proportional the charge state of the battery pack or the battery; and adjust the target preload force inversely proportional the charge state of the battery pack or the battery.

Furthermore, the controller 150 can: detect a longitudinal force applied to the kingpin 110 by a hitch of a tow vehicle (e.g., via a first strain gauge); detect a lateral force applied to the kingpin 110 by the hitch (e.g., via a second strain gauge); calculate a tractor-trailer 140 angle (e.g., a steering angle) based on the longitudinal force and the lateral force; adjust target torque output inversely proportional the tractor-trailer 140 angle; and adjust the target preload force proportional the tractor-trailer 140 angle. The controller 150 can then: calculate a total force applied to the kingpin 110 by the hitch based on the lateral force and the longitudinal force. Accordingly, in response to the total force exceeding the target preload force, the controller 150 can trigger a motor 131, arranged in the drive system 130, to increase torque output in the direction of motion of the trailer 140 to decrease a difference between the target preload force and a total force applied to the kingpin 110 (e.g., an actual force) to control the trailer 140 in conjunction with the tow vehicle. Alternatively, in response to the total force falling below the target preload force, the controller 150 can trigger the motor 131 to reduce torque output in the direction of motion of the trailer 140 to decrease a difference between the target preload force and the total force applied to the kingpin 110 (e.g., an actual force) to control the trailer 140 in conjunction with the tow vehicle.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin 110); to reduce emissions by the tow vehicle; to decrease fuel consumption by the tow vehicle; to extend the life of each battery pack coupled to the trailer 140; and to enable a driver of the tow vehicle to apply minimal to no brake force to the trailer 140 in tow mode.

At the end of tow mode, the controller 150 can identify a decoupling event between the kingpin 110 with the hitch of a tow vehicle and transition the kingpin 110 from the tow mode to the manual mode or from the tow mode to the hibernation mode.

10.1 Dynamic Target Preload Force: Tractor-Trailer Angle

Blocks of the method S100 recite: detect a direction of motion and a speed of the trailer 140 in Block S120; in response to the first total force falling below the first target preload force, triggering a motor 131, arranged in a drive system 130 located proximal a distal end of the trailer 140, to reduce torque output in the direction of motion to decrease a difference between the total force and the target preload force in Block S150; and, in response to a second total force falling below a second target preload force, triggering the motor 131 to increase torque output opposite the direction of motion to decrease a second difference between the second force and the second target preload force in Block S160.

In one implementation, shown in FIGS. 4 and 7B, the controller 150 can detect a direction of motion and a speed of the trailer 140, detect a lateral force and a longitudinal force applied to the kingpin 110 by the hitch, and calculate a tractor-trailer 140 angle as a condition of the trailer 140. Additionally, the controller 150 can access a lower speed limit (e.g., 25 miles per hour) and an upper speed limit of the trailer 140 (e.g., 65 miles per hour). The controller 150 can then leverage the tractor-trailer angle, the lower speed limit, and the upper speed limit to selectively increase, decrease, or disable torque output and adjust the target preload force.

For example, the controller 150 can: detect a longitudinal force applied to a kingpin 110, arranged on a proximal end of a trailer 140, by a hitch of a tow vehicle (e.g., via a first strain gauge); detect a lateral force applied to the kingpin 110 by the hitch (e.g., via a second strain gauge); detect a speed and a direction of motion of the trailer 140 (e.g., 30 miles per hour in forward direction via an inertial measurement unit); based on the longitudinal force and the lateral force, calculate a tractor-trailer 140 angle, between longitudinal axes of the trailer 140 and the tow vehicle and calculate a total force, applied to the kingpin 110 by the hitch; calculate a target preload force opposite the first direction of motion (e.g., reverse direction) and proportional to the first tractor-trailer 140 angle; trigger a motor 131, arranged in the drive system 130 located proximal a distal end of the trailer 140, to reduce torque output in the direction of motion (e.g., forward direction) in order to decrease a difference between the total force and the target preload force, in response to the speed of the trailer 140 (e.g., 30 miles per hour) exceeding a threshold speed (e.g., a lower speed limit of 25 miles per hour) and in response to the total force falling below the target preload force.

During a second time period, the controller 150 can: detect a second longitudinal force applied to the kingpin 110 by the hitch; detect a second lateral force applied to the kingpin 110 by the hitch; detect a second speed and a second direction (e.g., forward direction) of the trailer 140 (e.g., via an inertial measurement unit); based on the second longitudinal force and the second lateral force, calculate a second total force applied to the kingpin 110 by the hitch and calculate a second target preload force opposite the second direction of motion (e.g., a reverse direction) and proportional to the second tractor-trailer 140 angle; and trigger the motor 131 to increase torque output in the second direction of motion (e.g., forward direction) to decrease a difference between the second total force and the second target preload force, in response to the second speed exceeding the threshold speed (e.g., a lower speed limit of 25 miles per hour) and in response to the second total force exceeding the second target preload force.

During a third time period, the controller 150 can: detect a third longitudinal force applied to the kingpin 110 by the hitch; detect a third lateral force applied to the kingpin 110 by the hitch; detect a third speed and a third direction of motion of the trailer 140 (e.g., a forward direction); calculate a third total force applied to the kingpin 110 by the hitch of the tow vehicle based on the third longitudinal force and the third lateral force; and, in response to the third speed of the trailer 140 (e.g., 50 miles per hour) falling below a second threshold speed (e.g., an upper speed limit of 65 miles per hour), trigger the motor 131 to disable torque output in the third direction of motion. During a fourth time period, the controller 150 can: detect a fourth longitudinal force applied to the kingpin 110 by the hitch; detect a fourth lateral force applied to the kingpin 110 by the hitch; detect a fourth speed and a fourth direction of motion of the trailer 140 (e.g., 20 miles per hour in forward direction); in response to the fourth speed of the trailer 140 falling below the lower speed limit (e.g., 25 miles per hour), accessing a nominal low-speed preload force; calculating a fourth total force applied to the kingpin 110 by the hitch based on the fourth longitudinal force and the fourth lateral force; and, in response to the fourth total force exceeding the nominal low-speed preload force, trigger the motor 131 to increase torque output in the fourth direction of motion (e.g., forward direction) of the tow vehicle to decrease a difference between the fourth total force and the nominal low-speed preload force.

10.1.1 Dynamic Target Preload Force: Speed Variance+Duration

In one variation, in Block S122, the controller 150 can calculate a speed variance for the first time period and for the second time period and leverage the tractor-trailer 140 angles, in the aforementioned example, and these speed variances to calculate the target preload force.

For example, the controller 150 can: calculate a first speed variance of the trailer 140 during the first time period based on the first speed; calculate the first target preload force proportional the first tractor-trailer 140 angle and proportional the first speed variance; calculate the second tractor-trailer 140 angle less than the first tractor-trailer 140 angle; calculate a second speed variance of the trailer 140 during the second time period based on the second speed, the second speed variance greater than the first speed variance; and calculate the second target preload force, approximating the first target preload force, proportional the second tractor-trailer 140 angle and proportional the second speed variance.

In another variation, the controller 150 can calculate a duration of the trailer 140 exhibiting the first speed during the first time period and exhibiting the first speed during the next time period. The controller 150 can then calculate the target preload force inversely proportional these durations for the corresponding time period.

For example, the controller 150 can execute Blocks of the method S100 to detect a first speed and a first direction of motion of the trailer 140 (e.g., 30 miles per hour in forward direction via an inertial measurement unit) and detect a first total force applied to the kingpin 110 by the hitch during a first time period. The controller 150 can then: detect a first duration of the trailer 140 exhibiting the first speed; and calculate a first target preload force opposite the direction of motion of the tow vehicle and inversely proportional the first duration. During a second time period, the controller 150 can: detect a second speed of the trailer 140 corresponding to the first speed of the trailer 140; detect a second duration of the trailer 140 exhibiting the second speed; and, in response to the second duration exceeding the first duration, calculate a second target preload force, less than the first target preload force, opposite the direction of motion and inversely proportional the second duration. The controller 150 can then trigger the motor 131 to reduce torque output in the first direction of motion (e.g., forward direction) to decrease a first difference between the first total force and the first target preload force in response to the first total force falling below the first target preload force.

Therefore, the controller 150 can leverage the target preload force at the kingpin 110 to control the trailer 140 as the speed of the trailer 140 and a duration of the speed fluctuates during a drive route and thereby, enable a user (e.g., a driver) of the tow vehicle to apply minimal assistance to the trailer 140.

10.1.2 Dynamic Target Preload Force: Stiction+Regenerative Braking

In one variation, the controller 150 can detect a difference between the first total force and a second total force (e.g., a force impulse) for a duration of time while the trailer 140 is in motion. The controller 150 can then leverage the speed of the trailer 140, a threshold difference, and a threshold duration of time to identify a stiction event between the kingpin 110 and the hitch of the tow vehicle.

For example, the controller 150 can, during a first time period: detect a first total force applied to the kingpin 110 by the hitch of the tow vehicle; detect a speed and a direction of motion of the trailer 140 (e.g., 30 miles per hour in forward direction via an inertial measurement unit); based on the total force, calculate a tractor-trailer angle, between longitudinal axes of the trailer 140; calculate a target preload force opposite the first direction of motion (e.g., reverse direction) and proportional to the first tractor-trailer angle; trigger a motor 131, arranged in the drive system 130, to reduce torque output in the direction of motion (e.g., forward direction) in order to decrease a difference between the total force and the target preload force, in response to the speed of the trailer 140 (e.g., 30 miles per hour) exceeding a threshold speed (e.g., a lower speed limit of 25 miles per hour) and in response to the total force falling below the target preload force.

During a second period of time, the controller 150 can: detect a second total force applied to the kingpin 110 by the hitch of the tow vehicle; detect a speed and a direction of motion of the trailer 140 (e.g., 30 miles per hour in forward direction via an inertial measurement unit); detect a difference between the first total force and the second total force for a duration of time (e.g., 5 minutes); and, in response to the difference exceeding a threshold difference and in response to the duration exceeding a threshold duration of time, identify a stiction event between the kingpin 110 and the hitch of the tow vehicle and trigger the motor 131 to regeneratively brake the trailer 140. The controller 150 can then detect a third total force applied to the kingpin 110; and trigger the motor 131 to increase torque output in the direction of motion (e.g., forward direction) to decrease a difference between the third total force and the target preload force in response to the third total force exceeding the target preload force.

Therefore, the controller 150 can monitor forces applied to the kingpin 110 to identify a stiction event between the kingpin 110 and the hitch of the tow vehicle and trigger the motor 131 to selectively apply a regenerative braking force to slow motion of the trailer 140.

10.2 Dynamic Target Preload Force: Incline Angle of Trailer

In one implementation, in Block S134, the controller 150 can detect an incline angle of the trailer 140 representing a grade of the road (e.g., 5% grade, 10% grade) as a condition of the trailer 140 and then leverage the incline angle to selectively adjust the target preload force. Additionally, in response to the incline angle exceeding a threshold incline angle (e.g., trailer 140 is moving up a hill), the controller 150 can decrease the target preload force. Alternatively, in response to the incline angle falling below the threshold incline angle (e.g., trailer 140 is moving down a hill), the controller 150 can increase the target preload force.

For example, during a first time period, the controller 150 can: detect a first longitudinal force applied to the kingpin 110 by the hitch; detect a first lateral force applied to the kingpin 110 by the hitch of the tow vehicle; detect a first direction of motion of the trailer 140 (e.g., a forward direction); detect a first incline angle of the trailer 140 (e.g., 2.86 degrees, trailer 140 is moving up a hill); calculate a first total force, applied to the kingpin 110 by the hitch of the tow vehicle, based on the first longitudinal force and the first lateral force; calculate a first target preload force opposite the first direction of motion (e.g., a reverse direction) and proportional to the first incline angle (e.g., decrease target preload force); and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second force applied to the kingpin 110 by the hitch of the tow vehicle; detect a decline angle of the trailer 140 (e.g., −0.573 degrees, trailer 140 is moving down a hill); calculate a second target preload force opposite the direction of motion (e.g., a reverse direction) of the tow vehicle and inversely proportional the decline angle (e.g., increase target preload force); and, in response to the second force falling below the second target preload force, trigger the motor 131 to increase torque output opposite the direction of motion (e.g., reverse direction) in order to decrease the second difference between the second force and the second target preload force.

During a third time period, the controller 150 can: detect a third total force applied to the kingpin 110 by the hitch of the tow vehicle; detect the decline angle of the trailer 140 (e.g., −0.573 degrees, trailer 140 is moving down a hill); calculate a third target preload force opposite the second direction of motion and proportional to the decline angle of the trailer 140 (e.g., decrease target preload force); and, in response to the second total force exceeding the second target preload force, trigger the motor 131 to regeneratively brake the driven axle to slow motion of the trailer 140 and to decrease a second difference between the second total force and the second target preload force.

Therefore, the controller 150 can leverage the target preload force at the kingpin 110 to control the trailer 140 as the incline angle of the trailer 140 fluctuates as the trailer 140 navigates road grades during a drive route and thereby, reduce emissions and fuel consumption by the tow vehicle.

10.3 Dynamic Target Preload Force: Drive Route+Location of Trailer

In one variation, in Block S136, the controller 150 can detect a location of the trailer 140 as a condition of the trailer 140 and then leverage the location and a drive route assigned to the trailer 140 to selectively increase or decrease the target preload force.

Furthermore, an operator may define a start location and an end location for a drive route and upload this drive route to a user portal. The controller 150 can then: access the drive route; estimate a set of legs between the start location and the end location for the drive route; and populate each leg of the drive route with a time window, a corresponding georeferenced location, and emission conditions associated with the georeferenced location (e.g., a low-emissions region). The computer system can then access this drive route at the start of the tow mode. The controller 150 can also access signals from an inertial sensor to detect locations of the trailer 140 during the drive route.

For example, during a first time period, the controller 150 can: detect a first longitudinal force applied to the kingpin 110 by the hitch of the tow vehicle; detect a first lateral force applied to the kingpin 110 by the hitch; detect a first direction of motion and first speed of the trailer 140 (e.g., a forward direction); detect a first tractor-trailer 140 angle; calculate a first total force, applied to the kingpin 110 by the hitch, based on the first longitudinal force and the first lateral force; calculate a first target preload force opposite the first direction of motion (e.g., a reverse direction) and proportional the tractor-trailer 140 angle; and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second longitudinal force applied to the kingpin 110 by the hitch of the tow vehicle; detect a second lateral force applied to the kingpin 110 by the hitch; detect a second direction of motion and a second speed of the trailer 140 (e.g., a forward direction); detect a second tractor-trailer 140 angle; retrieve a first low-emissions region from a drive route assigned to the trailer 140; detect a first location of the trailer 140 (e.g., via an inertial measurement unit); calculate a second total force, applied to the kingpin 110 by the hitch, based on the second longitudinal force and the second lateral force; calculate a second target preload force opposite the second direction of motion (e.g., a reverse direction) and proportional the second tractor-trailer 140 angle; and, in response to the first location falling within the threshold distance of the low-emissions region and in response to the second speed exceeding the first threshold speed (e.g., 25 miles per hour) and in response to the second total force exceeding the target preload force, trigger the motor 131 to reduce torque output in the second direction of motion (e.g., forward direction) in order to decrease a second difference between the first total force and the first target preload force.

During a third time period, the controller 150 can: detect a third speed and a third direction of motion of the trailer 140 (e.g., forward direction); retrieve a last georeferenced location (e.g., a storage yard) from the drive route assigned to the trailer 140; detect a second location of the trailer 140; and, in response to the third speed of the trailer 140 falling below the first threshold speed and in response to the second location of the trailer 140 falling within the threshold distance of the last georeferenced location (e.g., a storage yard), trigger the motor to disable torque output in the third direction of motion (e.g., forward direction).

Therefore, the controller 150 can selectively increase or decrease the target preload force and the target torque output by the motor as the location of the trailer 140 fluctuates during the drive route. Additionally, the controller 150 can also leverage the target preload force and the location of the trailer 140 to enable a user (e.g., a driver) of the tow vehicle to apply minimal to no brakes to the trailer 140.

10.4 Dynamic Target Preload Force: Charge State of Battery

In one variation, in Block S138, the controller 150 can detect a "real-time" battery status (or a "charge state") of each battery pack in a set of battery packs of a battery coupled to the trailer 140. The controller 150 can then detect a charge state of the battery 106 (e.g., a numerical value, a percentage, a level) as a condition of the trailer 140 and leverage this charge state of the battery 106 to selectively adjust the target preload force.

For example, during a first time period, the controller 150 can: detect a first longitudinal force applied to the kingpin 110 by the hitch of the tow vehicle; detect a first lateral force applied to the kingpin 110 by the hitch; detect a first direction of motion and a first speed of the trailer 140 (e.g., a forward direction); detect a first charge state of a battery pack (e.g., 55%); detect a first tractor-trailer 140 angle; calculate a first total force, applied to the kingpin 110 by the hitch, based on the first longitudinal force and the first lateral force; calculate a first target preload force opposite the first direction of motion (e.g., a reverse direction) proportional the tractor-trailer 140 angle and inversely proportional the first charge state of the battery pack; and, in response to the first total force falling below the first target preload force, trigger the motor 131 to reduce torque output in the first direction of motion (e.g., forward direction) to decrease a first difference between the first total force and the first target preload force.

During a second time period, the controller 150 can: detect a second longitudinal force applied to the kingpin 110 by the hitch of the tow vehicle; detect a second lateral force applied to the kingpin 110 by the hitch; detect a second direction of motion and a second speed of the trailer 140 (e.g., a forward direction); detect a second tractor-trailer 140 angle less than the first tractor-trailer 140 angle; detect a second charge state of the battery pack (e.g., 75%) greater than the first charge state of the battery pack (e.g., 55%); calculate a second total force, applied to the kingpin 110 by the hitch, based on the second longitudinal force and the second lateral force; calculate a second target preload force opposite the second direction of motion (e.g., a reverse direction) proportional the second tractor-trailer 140 angle and inversely proportional the second charge state of the battery pack (e.g., 75%); and, in response to the second total force exceeding the target preload force, trigger the motor 131 to reduce torque output in the second direction of motion (e.g., forward direction) to decrease a second difference between the first total force and the first target preload force.

Alternatively, in response to the charge state of the battery pack falling below a threshold charge state (e.g., a predefined charge state), the controller 150 can: enter a drag charging mode; calculate a target preload force opposite the direction of motion (e.g., a reverse direction) proportional the tractor-trailer angle and inversely proportional the charge state of the battery pack (e.g., increase target preload force); and, in response to the total force falling below the target preload force, trigger the motor 131 to reduce torque output in the direction of motion (e.g., forward direction) to decrease a difference between the first total force and the first target preload force.

Additionally or alternatively, the controller 150 can access the drive route assigned to the trailer 140 and predict a charge state of the battery 106 at the start of the tow mode. Then for each leg of the drive route, the controller 150 can autonomously increase or decrease the target preload force at the kingpin 110 proportional the predicted charge state of the battery 106 associated with each leg of the drive route.

Therefore, the controller 150 can leverage a "real-time" charge state or a predicted charge state of each battery pack to selectively increase or decrease the target preload force and thereby, increase the life of the battery 106 and reduce emissions by the tow vehicle.

10.5 Target Preload Force: Weight on Driven Axle

In one variation, the drive system 130 can further include an air-ride suspension system coupled to the driven axle 137 and a pressure sensor configured to output signals representing combined air pressures of air bags in the air-ride suspension system. The controller 150 can then leverage these combined air pressures to approximate a weight of the trailer 140 (e.g., a load, a payload) on the driven axle 137 and then selectively trigger the motor 131 to disable torque output to the driven axle 137 and/or to regeneratively brake the driven axle 137 to slow motion of the trailer 140.

For example, the drive system 130 can include an air-ride suspension system coupled to the driven axle 137 and includes: a first air bag arranged proximal the left driven wheel 138; and a second air bag arranged proximal the right driven wheel 139. The drive system 130 can further include a pressure sensor coupled to the driven axle 137 and configured to output a signal representing a combined air pressure in the first air bag and the second air bag. The controller 150 can then: detect a force applied to the kingpin 110 by a hitch of a tow vehicle; detect a direction of motion of the trailer 140 (e.g., forward direction); and access a target preload force. The controller 150 can detect a combined air pressure in the first air bag and the second air bag based on the signal output by the pressure sensor 115. Then, in response to the combined air pressure in the first air bag and the second air bag exceeding a threshold air pressure and in response to the force falling below the target preload force, the controller 150 can: trigger the motor 131 to disable torque output to the driven axle 137; and trigger the motor 131 to regeneratively brake the driven axle 137.

In another variation, the controller 150 can: detect an air pressure of an air-ride suspension system coupled to the driven axle 137 (e.g., via a pressure sensor); and approximate a weight (e.g., a load, a payload) of the trailer 140 on the driven axle 137 based on the air pressure. Further, a user (e.g., an operator, a manager, a driver) can define a target weight (e.g., a weight limit, a weight standard) for each driven axle 137 and the controller 150 can then leverage this target weight to adjust target regenerative braking proportional to the approximated weight of the trailer 140 on the driven axle 137.

For example, the controller 150 can: detect a force applied to the kingpin 110 by a hitch of a tow vehicle; detect a direction of motion of the trailer 140 (e.g., forward direction); and access a target preload force. The controller 150 can then: interpret a weight of the trailer 140 on the driven axle 137 (e.g., 34,500 pounds) based on the combined air pressure; and, in response to the weight (e.g., 34,500 pounds) exceeding a target weight for the driven axle 137 (e.g., 34,000 pounds) and in response to the force exceeding the target preload force, trigger the motor 131 to regeneratively brake the driven axle 137 to redistribute the weight throughout the trailer 140.

Therefore, the controller 150 can interpret air pressures from the air-ride suspension system of the trailer 140 and leverage these air pressures to trigger the motor 131 to disable torque output to the driven axle 137 and/or to regeneratively brake the driven axle 137 to slow motion of the trailer 140. Additionally, the controller 150 can leverage these air pressures to interpret a weight of the trailer 140 on the driven axle 137 and trigger the motor 131 to regeneratively brake the driven axle 137 in order to achieve a weight balance of the trailer 140 on the driven axle 137.

10.6 Regenerative Braking: Wheel Speed Sensors+Traction

In one variation, the system 100 can include a set of wheel speed sensors. Each wheel speed sensor can couple to a corresponding driven wheel of the drive system 130 and the controller 150 can leverage signals output from each wheel speed sensor to track traction between the driven wheels of the drive system 130 and a ground surface and detect a speed of the trailer 140. The controller 150 can then trigger the motor 131 to selectively increase or decrease regenerative braking of the left driven wheel 138 and the right driven wheel 139 based on the level of traction and/or the speed of the trailer 140.

For example, the controller 150 can: detect a force applied to the kingpin by the hitch; and access a target preload force on the kingpin 110. Then, in response to the force exceeding the target preload force, the controller 150 can trigger the motor 131 to regeneratively brake the trailer 140. The controller 150 can then: detect loss of traction at the driven axle 137 (e.g., between the left driven wheel 138 and a ground surface) based on a signal output by the set of wheel speed sensors; and, in response to detecting loss of traction at the driven axle 137 and in response to the force exceeding the target preload force, trigger the motor 131 to reduce regenerative braking to the driven axle 137.

Further, the controller 150 can: detect a presence of traction at the driven axle 137 (e.g., between the left driven wheel 138 and the ground surface) based on a next signal output by the set of wheel speed sensors; and, in response to detecting presence of traction at the driven axle 137, automatically trigger the motor 131 to increase regenerative braking to the driven axle 137 (e.g., the left driven wheel 138).

Therefore, the controller 150 can leverage the target preload force and signals output from the set of wheel speed sensors to regeneratively brake the driven axle 137, and thereby, maintain traction between the driven wheels of the trailer 140 and a ground surface.

10.7 Unauthorized Movements of Trailer

In one variation, the controller 150 can detect a force applied to the kingpin 110 in a direction opposite an acceleration of the trailer 140 and identify an unauthorized movement of the trailer 140. The controller 150 can then trigger the motor to disable torque output and trigger the drive system 130 to apply a regenerative brake force to the trailer 140.

For example, the controller 150 can: access a second signal from a set of force sensors 119 (e.g., strain gauges); calculate a direction of the second force based on the signal; in response to detecting the direction of the second force opposite to the first direction of a first force (e.g., direction of force opposite acceleration of the trailer 140), trigger the motor to disable torque output; and trigger the drive system 130 to apply a regenerative brake force proportional to the second force.

Additionally, in response to detecting the direction of the second force opposite to the first direction of a first force (e.g., direction of force opposite acceleration of the trailer 140), the controller 150 can: identify the direction of the second force opposite to the first direction of the first force as an unauthorized movement event of the trailer 140; and generate an alert notifying a user (e.g., an operator, an owner, a driver) of this unauthorized movement event.

Therefore, in tow mode, the controller 150, the kingpin 110, and the drive system 130 can cooperate to prevent unauthorized movement events of the trailer 140 by: monitoring forces and accelerations of the trailer 140 at the kingpin 110; disabling torque output by the motor; and applying a regenerative brake force to slow motion of the trailer 140.

11. Variation: Sensor Redundancy+Fasteners with Integral Sensors

In one variation, the kingpin 110 can include a set of sensor fasteners configured to mount the kingpin 110 to the trailer 140 and to output signals corresponding to lateral and longitudinal forces applied to the kingpin 110.

In one implementation, the set of fasteners are configured to fasten the base of the kingpin 110 to a floor 146 of the trailer 140 via the set of through-bores 114 and include: a first sensor fastener including a first strain gauge and arranged in a first through-bore, in the set of through-bores 114, laterally offset from the kingpin 110; and a second sensor fastener including a second strain gauge and arranged in a second through-bore, in the set of through-bores 114, longitudinally offset from the kingpin 110.

In another implementation, the set of fasteners is configured to fasten the base of the kingpin 110 to a floor 146 of the trailer 140 via the set of through-bores 114 and includes a first sensor fastener and a second sensor fastener. The first sensor fastener includes a first sensor arranged in a first through-bore, in the set of through-bores 114, laterally offset from the kingpin 110 and configured to output a signal representing a first vertical load through the kingpin 110 proximal the first through-bore. The second sensor fastener includes a second sensor arranged in a second through-bore, in the set of through-bores 114, longitudinally offset from the kingpin 110 and configured to output a signal representing a second vertical load through the kingpin 110 proximal the second through-bore.

Furthermore, the controller 150 can access signals from the set of strain gauges and implement Blocks of the method S100 to calculate a direction and a magnitude of a force applied to the kingpin 110. Similarly, the controller 150 can access signals from the set of sensor fasteners and implement Blocks of the method S100 to calculate the direction and the magnitude of this force applied to the kingpin 110. The controller 150 can then leverage the direction and magnitude of the force from the set of sensors 119 and from the set of sensor fasteners to increase torque output and/or to identify a failure of a strain gauge at the kingpin 110.

For example, the controller 150 can: access a first signal from the first sensor 119 representing a first lateral force applied to the kingpin 110; access a second signal from the second sensor 119 (e.g., a strain gauge) representing a first longitudinal force applied to the kingpin 110; and calculate a first direction and a first magnitude of a first force applied to the kingpin 110 based on the first signal and the second signal. The kingpin 110 can include the set of fasteners 118 configured to fasten the base of the kingpin 110 111 to the floor 146 of the trailer 140 via the set of through-bores 114. The set of fasteners 118 can include: a first sensor fastener arranged in a first through-bore, in the set of through-bores 114, laterally offset from the kingpin 110 and including a third sensor configured to output a third signal representing a first vertical load through the kingpin 110 proximal the first through-bore; and a fourth sensor fastener arranged in a second through-bore, in the set of through-bores 114, longitudinally offset from the kingpin 110 and including a second sensor configured to output a fourth signal representing a second vertical load through the kingpin 110 proximal the second through-bore. The controller 150 can then: access the third signal from the first sensor fastener; interpret a second lateral force applied to the kingpin 110 based on the third signal; access the fourth signal from the second sensor fastener; and interpret a second longitudinal force applied to the kingpin 110 based on the fourth signal. At a first time in tow mode, the controller 150 can trigger the motor 131 to output the torque in the first direction of the first force and proportional the first magnitude of the first force, in response to correspondence between the first lateral force and the second lateral force, and in response to correspondence between the first longitudinal force and the second longitudinal force. At a second time, in tow mode, the controller 150 can deactivate the motor in response to incongruity between the first longitudinal force and the second longitudinal force.

In another variation, the kingpin 110 includes a set of sensors 119 configured to generate analog voltages of forces applied to the kingpin 110 and an amplifier configured to convert these analog voltages into digital signals. The controller 150 can then leverage these digital signals to calculate a direction and a magnitude of a force applied to the kingpin 110 and compare this direction and magnitude to analog values from the force sensors 119.

For example, the kingpin 110 can include: a first sensor 119 configured to output a first signal as a first analog voltage corresponding to a lateral force applied to the kingpin 110; and a second sensor 119 configured to output a second signal as a second analog voltage corresponding to a longitudinal force applied to the kingpin 110. The controller 150 can then calculate a first direction of a first force applied to the kingpin 110 based on the first analog voltage and the second analog voltage. The kingpin 110 can also include an amplifier configured to: convert the first analog voltage into a first digital signal within a voltage range representing the lateral force; and convert the second analog voltage into a second digital signal within the voltage range representing the longitudinal force. The controller 150 can: calculate a second direction of the first force applied to the kingpin 110 based on the first digital signal and the second digital signal; detect the first direction deviating from the second direction of the first force; in response to detecting the first direction deviating from the second direction of the first force for a duration of time exceeding a threshold duration of time, trigger the motor 131 to disable torque output in Block S180; and activate a hibernation mode. Thus, the controller 150 can verify the direction and magnitude of a force applied to the kingpin 110 with analog values and/or digital signals to identify sensor 119 failures at the kingpin 110 and enter a hibernation mode.

Therefore, the controller 150 can leverage the set of strain gauges of the kingpin 110 and the set of sensor fasteners to identify a strain gauge failure at the kingpin 110 and to selectively deactivate the motor 131.

However, the kingpin 110 can include any other type of sensor fastener in order to fasten the kingpin 110 to the floor 146 of a trailer 140 and output signals representing forces applied to the kingpin 110.

11.1 Coupling Event Confirmation+Proximity Sensors

Figure 6A:
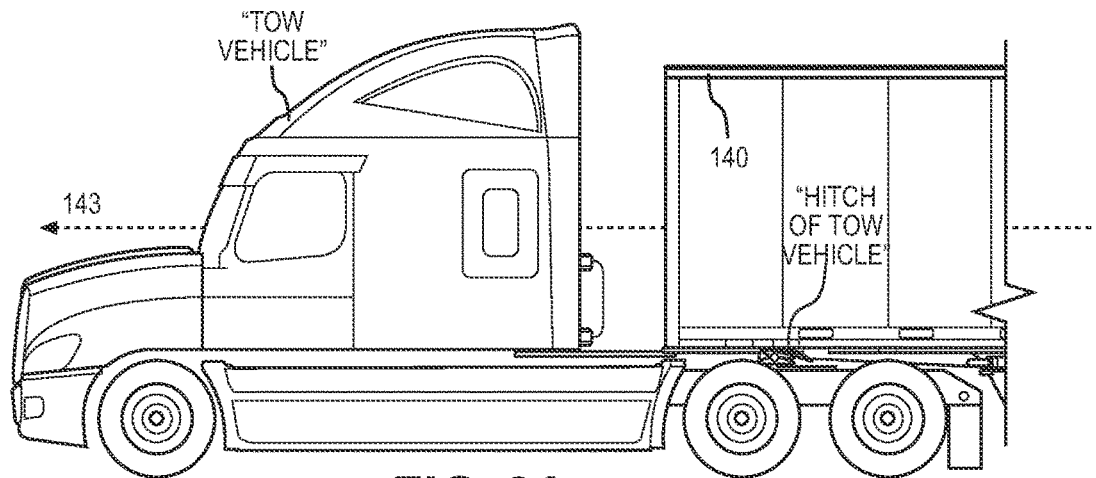
FIGS. 6A, 6B, 6C, 6D, and 6E are schematic representations of one variation of the system.
Figure 6B:
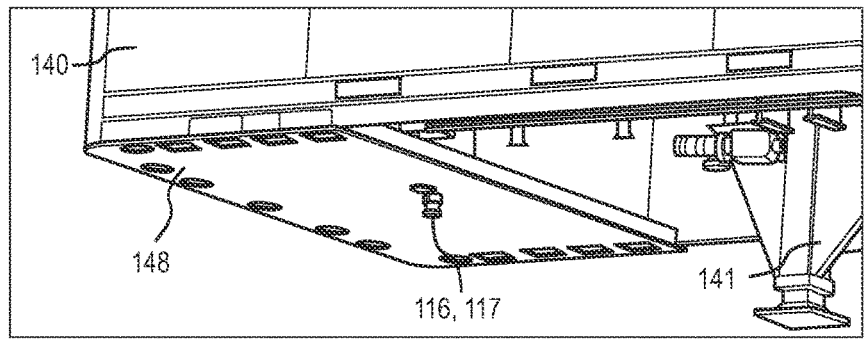
Figure 6C:
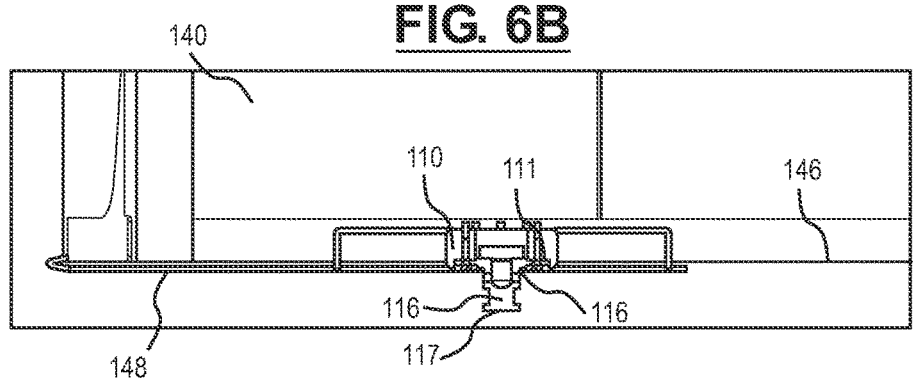
Figures 6D, 6E:
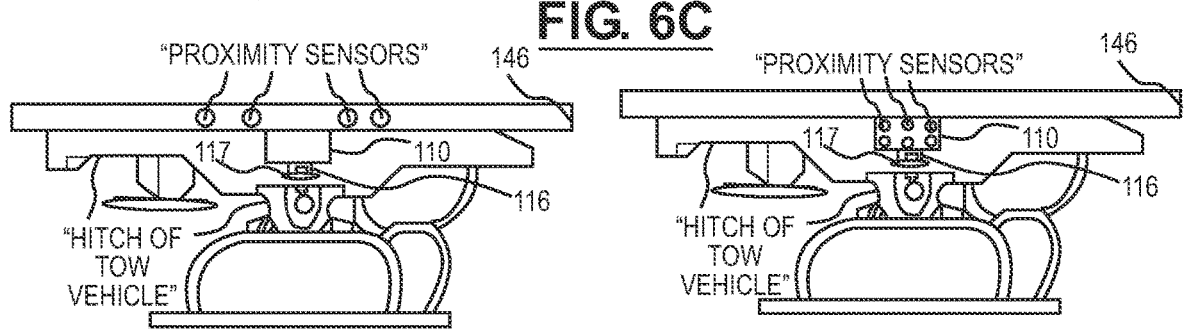

In one variation, shown in FIGS. 6D and 6E, the kingpin 110 can include a set of proximity sensors (e.g., Hall effect sensors, capacitive sensors, inductive sensors) configured to output signals representing presence of a hitch of a tow vehicle within a threshold distance of the kingpin 110. The controller 150 can then leverage these signals to interpret presence of the hitch within the threshold distance of the kingpin 110 and confirm a coupling event with the kingpin 110. Alternatively, the controller 150 can leverage these signals to detect absence of the hitch within the threshold distance of the kingpin 110 and, in response to detecting absence of the hitch within the threshold distance of the kingpin 110, trigger the motor 131 to disable torque output to prevent a jackknifing event.

For example, the kingpin 110 can include an array of proximity sensors: coupled to and radially arranged on the base of the kingpin 110; facing the shank of the kingpin 110; and configured to output a signal representing absence of a hitch of the tow vehicle (e.g., jaws of a fifth wheel of a tractor) within a threshold distance of the kingpin 110. The controller 150 can then: access the signal; detect absence of the hitch of the tow vehicle (e.g., jaws of a fifth wheel of a tractor) within the threshold distance of the kingpin 110; and, in response to detecting absence of the hitch within the threshold distance of the kingpin 110, trigger the motor 131 to disable torque output, and thus, prevent a jackknifing event between the tow vehicle and the trailer 140 (e.g., tow vehicle brakes to a stop and the trailer 140 continues to move toward and push the tow vehicle kingpin 110).

Alternatively, the controller 150 can: access the signal; detect presence of the hitch of the tow vehicle (e.g., jaws of a fifth wheel of a tractor) within the threshold distance of the kingpin 110; and, in response to detecting presence of the hitch within the threshold distance of the kingpin 110, confirm a coupling event between the hitch of the tow vehicle and the trailer 140.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period:
detecting a first load of a trailer;
detecting a first acceleration of the trailer;
deriving a first representation of force applied to a kingpin, arranged on a proximal end of the trailer, by a hitch of a tow vehicle based on the first acceleration and the first load of the trailer;
accessing an incline angle and a first direction of motion of the trailer;
defining a first target preload force opposite the first direction of motion and proportional to the first incline angle; and
in response to the first representation of force falling below the first target preload force, triggering a motor, arranged in a drive system located proximal a distal end of the trailer, to increase torque output in the first direction of motion to decrease a first difference between the first representation of force and the first target preload force; and
during a second time period:
detecting a second acceleration of the trailer;
deriving a second representation of force applied to the kingpin, by the hitch of the tow vehicle, based on the second acceleration and the first load of the trailer;
accessing a decline angle of the trailer;
defining a second target preload force opposite the first direction of motion and inversely proportional to the decline angle; and
in response to the second representation of force falling below the second target preload force, triggering the motor to increase torque output opposite the first direction of motion to decrease a second difference between the second representation of force and the second target preload force.

2. The method of claim 1:
wherein detecting the first load of the trailer comprises:
accessing a first signal from a pressure sensor coupled to the drive system supporting a distal end of the trailer;
detecting an air pressure within a pneumatic suspension system supporting the drive system based on the first signal; and
interpreting the first load of the trailer carried by the drive system based on the air pressure within the pneumatic suspension system; and
wherein detecting the first acceleration of the trailer comprises:
accessing a second signal representing accelerations of the trailer from an accelerometer arranged on the trailer proximal the kingpin; and
detecting the first acceleration of the trailer based on the second signal.

3. The method of claim 1:
wherein accessing the first direction of motion of the tow vehicle comprises interpreting the first direction of motion of the trailer in a forward direction;
wherein defining the first target preload force comprises calculating the first target preload force, in a reverse direction, inversely proportional to the incline angle, the reverse direction opposite the forward direction;
wherein triggering the motor to reduce torque output in the first direction of motion during the first time period comprises triggering the motor to increase torque output in the forward direction to decrease the first difference between the first representation of force applied to the kingpin and the first target preload force; and
wherein triggering the motor to decrease torque output in the first direction of motion during the second time period comprises triggering the motor to decrease torque output in the forward direction to decrease the second difference between the second representation of force applied to the kingpin and the second target preload force.

4. The method of claim 1:
further comprising, during the first time period:
interpreting a first speed of the trailer;
accessing a first signal representing a first distance between the trailer and a left feature on a corresponding left side of the tow vehicle;
accessing a second signal representing a second distance between the trailer and a right feature on a corresponding right side of the tow vehicle; and
calculating a first tractor-trailer angle based on the first signal and the second signal;
wherein accessing the first target preload force comprises calculating the first target preload force:
opposite the first direction of motion;
proportional to the first tractor-trailer angle; and
inversely proportional to the first incline angle; and
wherein triggering the motor to increase torque output in the first direction of motion during the first time period comprises, in response to the first speed of the trailer falling below a first threshold speed and in response to the first representation of force applied to the kingpin falling below the first target preload force:
triggering the motor to reduce torque output in the first direction of motion to decrease the first difference between the first representation of force applied to the kingpin and the first target preload force.

5. The method of claim 4:
further comprising, during the second time period:
    accessing a third signal representing a third distance between the trailer and the left feature on the corresponding left side of the tow vehicle;
    accessing a fourth signal representing a fourth distance between the trailer and the right feature on the corresponding right side of the tow vehicle;
    calculating a second tractor-trailer angle based on the third signal and the fourth signal, the second tractor-trailer angle less than the first tractor-trailer angle; and
    interpreting a second speed of the trailer;
wherein defining the second target preload force during the second time period comprises calculating the second target preload force:
    approximating the first target preload force;
    proportional to the second tractor-trailer angle; and
    inversely proportional to the decline angle; and
wherein triggering the motor to increase torque output opposite the first direction of motion to decrease the second difference during the second time period comprises in response to the second speed exceeding the first threshold speed and in response to the second representation of force falling below the second target preload force:
    triggering the motor to increase torque output opposite the first direction of motion to decrease the second difference between the second representation of force and the second target preload force.

6. The method of claim 1:
further comprising, during the first time period:
    accessing a first signal representing a first wheel speed of the trailer from a first wheel speed sensor;
    accessing a second signal representing a second wheel speed of the trailer from a second wheel speed sensor; and
    calculating a first wheel speed difference of the trailer based on the first signal and the second signal;
wherein defining the first target preload force comprises defining the first target preload force:
    opposite the first direction of motion; and
    proportional to the first wheel speed difference;
further comprising, during the second time period:
    accessing a third signal representing a third wheel speed of the trailer from the first wheel speed sensor;
    accessing a fourth signal representing a fourth wheel speed of the trailer from the second wheel speed sensor; and
    calculating a second wheel speed difference of the trailer based on the third signal and the fourth signal, the second speed difference greater than the first speed difference; and
wherein defining the second target preload force comprises defining the second target preload force:
    opposite the first direction of motion; and
    proportional to the second speed difference.

7. The method of claim 1:
further comprising, during the first time period, detecting a first longitudinal force applied to the kingpin by the hitch;
wherein deriving the first representation of force applied to the kingpin comprises calculating a first total force applied to the kingpin based on the first longitudinal force, the first acceleration, and the first load;
further comprising, during the second time period, detecting a second longitudinal force applied to the kingpin by the hitch; and
wherein deriving the second representation of force applied to the kingpin comprises calculating a second total force applied to the kingpin based on the second longitudinal force, the second acceleration, and the first load.

8. The method of claim 1, further comprising, during a third time period:
detecting a third acceleration of the trailer;
deriving a third representation of force applied to the kingpin, by the hitch of the tow vehicle, based on the third acceleration and the first load of the trailer;
accessing a second decline angle of the trailer;
defining a third target preload force:
    opposite the first direction of motion; and
    proportional to the second decline angle; and
in response to the third representation of force exceeding the third target preload force, triggering the motor to regeneratively brake a driven axle of the drive system:
    to slow motion of the trailer; and
    to decrease a third difference between the third representation of force and the third target preload force.

9. The method of claim 8:
wherein accessing the first direction of motion of the tow vehicle comprises interpreting the first direction of motion of the trailer in a forward direction;
wherein defining the third target preload force opposite the first direction of motion comprises calculating the third target preload force in the reverse direction, opposite the forward direction, and proportional to the second decline angle of the trailer; and
wherein triggering the motor to regeneratively brake the driven axle to slow motion of the trailer comprises triggering the motor to regeneratively brake the driven axle of the drive system:
    to increase torque output in the reverse direction; and
    to decrease the third difference between the third representation of force and the third target preload force.

10. The method of claim 1:
wherein detecting the first load of the trailer comprises:
    accessing a first signal output by a load cell coupled to the kingpin;
    interpreting the first load of the trailer based on the first signal; and
wherein detecting the first acceleration of the trailer comprises:
    accessing a second signal output by an accelerometer arranged on the trailer proximal the kingpin; and
    detecting the first acceleration of the trailer based on the second signal.

11. The method of claim 1, wherein triggering the motor to increase torque output opposite the first direction of motion during the second time comprises, in response to the second representation of force falling below the second target preload force, triggering the motor to regeneratively brake a driven axle of the drive system:
    to increase torque output opposite the first direction of motion; and
    to decrease the second target preload force.

12. The method of claim 1:
further comprising, during the first time period, detecting a first charge state of a battery coupled to the trailer;
wherein defining the first target preload force comprises calculating the first target preload force:

opposite the first direction of motion;
proportional to the incline angle; and
inversely proportional to the first charge state;
further comprising, during the second time period, detecting a second charge state, greater than the first charge state, of the battery; and
wherein defining the second target preload force comprises calculating the second target preload force:
approximating the first target preload force;
inversely proportional to the decline angle; and
inversely proportional to the second charge state.

13. The method of claim 1, further comprising, during a third time period:
detecting a third acceleration of the trailer;
detecting a second load of the trailer, the second load less than the first load of the trailer;
deriving a third representation of force applied to the kingpin, by the hitch of the tow vehicle, based on the third acceleration and the second load of the trailer;
interpreting a second incline angle of the trailer;
defining a third target preload force opposite the first direction of motion and proportional to the second incline angle; and
in response to the third target representation of force falling below the third target preload force, triggering the motor to increase torque output in the first direction of motion to decrease a third difference between the third representation of force and the third target preload force.

14. The method of claim 1:
wherein detecting the first acceleration of the trailer comprises detecting a first change in acceleration of the trailer;
wherein defining the first target preload force opposite the first direction of motion comprises calculating a first change in torque output in the first direction of motion based on the first change in acceleration;
wherein triggering the motor to increase torque output in the first direction of motion during the first time period comprises triggering the motor to increase torque output to the first change in torque output;
wherein detecting the second acceleration of the trailer comprises detecting a second change in acceleration of the trailer;
wherein defining the second target preload force opposite the first direction of motion comprises calculating a second change in torque output opposite the first direction of motion based on the second change in acceleration; and
wherein triggering the motor to increase torque output opposite the first direction of motion during the second time period comprises triggering the motor to increase torque output to the second change in torque output.

15. A method comprising:
during a first time period:
detecting a first acceleration of a trailer;
deriving a first representation of force applied to a kingpin, arranged on a proximal end of the trailer, by a hitch of a tow vehicle, based on the first acceleration of the trailer;
accessing a direction of motion of the trailer;
detecting a first wheel speed difference of the trailer;
defining a first target preload force opposite the direction of motion and proportional to the first wheel speed difference; and
in response to the first representation of force falling below the first target preload force, triggering a motor, arranged in a drive system located proximal a distal end of the trailer, to increase torque output in the direction of motion to decrease a first difference between the first representation of force and the first target preload force; and
during a second time period:
detecting a second acceleration of the trailer;
deriving a second representation of force applied to the kingpin, by the hitch of the tow vehicle, based on the second acceleration of the trailer;
detecting a second wheel speed difference of the trailer;
defining a second target preload force opposite the direction of motion and proportional to the second wheel speed difference; and
in response to the second representation of force falling below the second target preload force, triggering the motor to increase torque output opposite the direction of motion to decrease a second difference between the second representation of force and the second target preload force.

16. The method of claim 15:
further comprising, during the first time period, detecting a first duration of the trailer exhibiting the first wheel speed difference;
wherein defining the first target preload force comprises defining the first target preload force opposite the direction of motion of the trailer, proportional to the first wheel speed difference, and inversely proportional to the first duration; and
further comprising, during a third time period:
detecting a third wheel speed difference, corresponding to the first wheel speed difference, of the trailer;
detecting a second duration of the trailer exhibiting the first wheel speed difference;
detecting a third acceleration of the trailer;
deriving a third representation of force applied to the kingpin, by the hitch of the tow vehicle, based on the third acceleration;
in response to the second duration exceeding the first duration, defining a third target preload force:
less than the first target preload force;
opposite the direction of motion; and
inversely proportional to the second duration; and
in response to the third representation of force falling below the third target preload force, triggering the motor to reduce torque output in the direction of motion to decrease a third difference between the third representation of force and the third target preload force.

17. The method of claim 16:
further comprising, during the first time period, detecting a first load of the trailer;
wherein deriving the first representation of force applied to the kingpin during the first time period comprises deriving the first representation of force applied to the kingpin, by the hitch of the tow vehicle, based on the first acceleration of the trailer and the first load of the trailer;
wherein deriving the second representation of force applied to the kingpin during the second time period comprises deriving the second representation of force applied to the kingpin, by the hitch of the tow vehicle, based on the second acceleration of the trailer and the first load of the trailer; and
wherein deriving the third representation of force applied to the kingpin during the third time period comprises, deriving the third representation of force applied to the kingpin by the hitch of the tow vehicle, based on the third acceleration and the first load of the trailer.

18. The method of claim 15:
wherein detecting the first wheel speed difference of the trailer comprises:
   accessing a first signal representing a first wheel speed of the trailer from a first wheel speed sensor;
   accessing a second signal representing a second wheel speed of the trailer from a second wheel speed sensor; and
   detecting the first wheel speed difference of the trailer based on the first signal and the second signal; and
wherein detecting the second wheel speed difference of the trailer comprises:
   accessing a third signal representing a third wheel speed of the trailer from the first wheel speed sensor;
   accessing a fourth signal representing a fourth wheel speed of the trailer from the second wheel speed sensor; and
   detecting the second wheel speed difference of the trailer based on the third signal and the fourth signal, the second wheel speed difference greater than the first wheel speed difference.

19. A method comprising:
during a first time period:
   detecting a first direction and a first change in acceleration of the trailer;
   accessing an incline angle and a direction of motion of the trailer;
   calculating a first change in torque output in the direction of motion based on the first change in acceleration; and
   triggering a motor, arranged in a drive system located proximal a distal end of the trailer, to increase torque output in the direction of motion to the first change in torque output; and
during a second time period:
   detecting the direction of motion and a second change in acceleration of the trailer;
   calculating a second change in torque output opposite the direction of motion based on the second change in acceleration; and
   triggering the motor to increase torque output opposite the direction of motion to the second change in torque output.

20. The method of claim 19:
further comprising, during the first time period:
   detecting a first load of the trailer;
   deriving a first representation of force applied to a kingpin, arranged on a proximal end of the trailer, by a hitch of a tow vehicle based on the first change in acceleration and the first load of the trailer; and
wherein calculating the first change in torque output in the direction of motion comprises defining a first target preload force:
   opposite the direction of motion; and
   proportional to the incline angle; and
wherein triggering the motor to increase torque output in the direction of motion during the first time period comprises, in response to the first representation of force falling below the first target preload force:
   triggering the motor to increase torque output in the direction of motion to decrease a first difference between the first representation of force and the first target preload force; and
further comprising, during the second time period:
   deriving a second representation of force applied to the kingpin, by the hitch of the tow vehicle, based on the second change in acceleration and the first load of the trailer; and
   accessing a decline angle of the trailer;
wherein calculating the second change in torque output in the direction of motion comprises defining a second target preload force:
   opposite the direction of motion; and
   inversely proportional to the decline angle; and
wherein triggering the motor to increase torque output opposite the direction of motion during the second time period comprises, in response to the second representation of force falling below the second target preload force:
   triggering the motor to increase torque output opposite the direction of motion to decrease a second difference between the second representation of force and the second target preload force.

* * * * *